United States Patent
Lessing et al.

(10) Patent No.: US 10,792,807 B2
(45) Date of Patent: *Oct. 6, 2020

(54) FLEXIBLE AND STRETCHABLE ELECTRONIC STRAIN-LIMITED LAYER FOR SOFT ACTUATORS

(71) Applicant: President and Fellows of Harvard College, Cambridge, MA (US)

(72) Inventors: Joshua Aaron Lessing, Cambridge, MA (US); Ramses V. Martinez, Madrid (ES); Alok Suryavamsee Tayi, Somerville, MA (US); Jason Ming Ting, Katy, TX (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/972,412

(22) Filed: May 7, 2018

(65) Prior Publication Data

US 2019/0030710 A1    Jan. 31, 2019

Related U.S. Application Data

(63) Continuation of application No. 14/832,071, filed on Aug. 21, 2015, now Pat. No. 9,993,921.

(Continued)

(51) Int. Cl.
*B25J 9/14*        (2006.01)
*B25J 9/00*        (2006.01)
(Continued)

(52) U.S. Cl.
CPC ............. *B25J 9/142* (2013.01); *B25J 9/0012* (2013.01); *B25J 13/08* (2013.01); *B25J 15/0009* (2013.01);
(Continued)

(58) Field of Classification Search
CPC ........ B25J 9/142; B25J 13/08; B25J 15/0009; B25J 15/12; B25J 19/028; Y10S 901/22; F15B 15/10
(Continued)

(56) References Cited

U.S. PATENT DOCUMENTS

| 4,337,921 A | 7/1982 | Edwards |
| 4,976,191 A | 12/1990 | Suzumori et al. |

(Continued)

FOREIGN PATENT DOCUMENTS

| DE | 102009029972 A1 | 12/2010 |
| EP | 0534778 A2 | 3/1993 |

(Continued)

OTHER PUBLICATIONS

Cohen, et al., A Highly Elastic, Capactive Strain Guage Based on Percolating Nanotube Networks, ACS Publicatoin (2012).*

(Continued)

*Primary Examiner* — Thomas E Lazo
*Assistant Examiner* — Daniel S Collins
(74) *Attorney, Agent, or Firm* — Wilmer Cutler Pickering Hale and Dorr LLP

(57) ABSTRACT

A soft robot having an integrated electrical component includes an expandable or collapsible body, the body comprising an inlet that is configured to communicate with a fluid source and a flexible strain limited layer secured to a portion of the expandable or collapsible body, wherein the strain limited layer includes at least one electrical component.

43 Claims, 28 Drawing Sheets

Related U.S. Application Data

(60) Provisional application No. 62/040,905, filed on Aug. 22, 2014.

(51) Int. Cl.
  *B25J 13/08* (2006.01)
  *B25J 15/00* (2006.01)
  *B25J 15/12* (2006.01)
  *B25J 19/02* (2006.01)
  *B25J 18/06* (2006.01)

(52) U.S. Cl.
  CPC .............. *B25J 15/12* (2013.01); *B25J 18/06* (2013.01); *B25J 19/028* (2013.01); *Y10S 901/22* (2013.01)

(58) Field of Classification Search
  USPC .......................................................... 92/90
  See application file for complete search history.

(56) References Cited

U.S. PATENT DOCUMENTS

| | | | |
|---|---|---|---|
| 5,568,957 | A | 10/1996 | Haugs |
| 6,718,766 | B2 | 4/2004 | Seto et al. |
| 7,198,594 | B2 | 4/2007 | Shahinpoor |
| 2002/0157388 | A1 | 10/2002 | Seto et al. |
| 2006/0028041 | A1 | 2/2006 | Ono et al. |
| 2009/0137952 | A1 | 5/2009 | Ramamurthy et al. |
| 2010/0258362 | A1 | 10/2010 | Trimmer |
| 2010/0295417 | A1 | 11/2010 | Wood et al. |
| 2010/0319341 | A1 | 12/2010 | Blitz et al. |
| 2011/0198019 | A1 | 8/2011 | Tilson et al. |
| 2012/0031218 | A1 | 2/2012 | Galloway et al. |
| 2012/0271339 | A1 | 10/2012 | O'Beirne et al. |
| 2013/0110289 | A1 | 5/2013 | Cho et al. |
| 2013/0312541 | A1 | 11/2013 | Majidi et al. |
| 2014/0041904 | A1 | 2/2014 | Pedder |
| 2014/0109560 | A1 | 4/2014 | Ilievski et al. |
| 2014/0180134 | A1 | 6/2014 | Hoseit |
| 2015/0257839 | A1 | 9/2015 | Vause et al. |
| 2015/0309563 | A1 | 10/2015 | Connor |

FOREIGN PATENT DOCUMENTS

| | | |
|---|---|---|
| EP | 1190819 A1 | 3/2002 |
| GB | 2296941 A | 7/1996 |
| JP | S63266357 A | 11/1988 |
| JP | H02-134465 A | 5/1990 |
| JP | H04-370407 A | 12/1992 |
| JP | 2006-204612 A | 8/2006 |
| JP | 2010-214474 A | 9/2010 |
| JP | 2014-531986 A | 12/2014 |
| JP | 2014-533975 A | 12/2014 |
| JP | 2017-526543 A | 9/2017 |
| WO | WO-98/49976 A1 | 11/1998 |
| WO | WO-01/72479 A1 | 10/2001 |
| WO | WO-2007/015324 A1 | 2/2007 |
| WO | WO-2012/124546 A1 | 9/2012 |
| WO | WO-2012/148472 A2 | 11/2012 |
| WO | WO-2013/033669 A2 | 3/2013 |
| WO | WO-2013/038301 A2 | 3/2013 |
| WO | WO-2013/110086 A1 | 7/2013 |
| WO | WO-2013/130760 A2 | 9/2013 |
| WO | WO-2013/148340 A2 | 10/2013 |
| WO | WO-2014/113781 A1 | 7/2014 |

OTHER PUBLICATIONS

Khajeh, et al., Paper-Based Strain Sensing Material. MEMS, Jan. 20-24, 2013.*
Anisfield, "Ascension Technology Puts Spotlight on DC Field Magnetic Motion Tracking," HP Chronical Aug. 2000, vol. 17, No. 9, 3 pages.
Abate, C. J., "The Basics of Thermocouples", Circuit Cellar, retrieved online from URL:< http://circuitcellar.com/cc-blog/the-basics-of-thermocouples/>, Jul. 19, 2012 (8 pages).
Andersson, P., et al., "Active Matrix Displays Based on All-Organic Electrochemical Smart Pixels Printed on Paper," Advanced Materials, vol. 14, Issue 20, pp. 1460-1464 (Oct. 16, 2002).
Barr, M. C., et al., "Direct Monolithic Integration of Organic Photovoltaic Circuits on Unmodified Paper," Advanced Materials, vol. 23, Issue 31, pp. 3500-3505 (Aug. 16, 2011).
Onal, Cagdas, et al., "A Modular Approach to Soft Robots," The Fourth IEEE RAS/EMBS International Conference on Biomedical Robots and Biomechatronics, Rome, Italy, Jun. 24-27, 2012, 8 pages.
Chen, R., et al., "Modeling and Analysis of Electric Field and Electrostatic Adhesion Force Generated by Interdigital Electrodes for Wall Climbing Robots," IEEE/RSJ International Conference on Intelligent Robots and Systems (IROS), Tokyo, Japan, 6 pages—entire document (Nov. 3-7, 2013).
Extended European Search Report issued by the European Patent Office for European Application No. 15834002.6 dated May 11, 2018 (8 pages).
Extended European Search Report issued by the European Patent Office for European Application No. 15834529.8 dated May 11, 2018 (8 pages).
Extended European Search Report issued European Patent Office for European Application No. 16780397.2 dated May 15, 2018 (7 pages).
Gorrn, P., et al., "Isotropically stretchable gold conductors on elastomeric substrates," Soft Matter, vol. 7, Issue 16, pp. 7177-7180 (Jul. 5, 2011).
Graudejus, O., et al., "Encapsulating Elastically Stretchable Neural Interfaces: Yield, Resolution, and Recording/Stimulation of Neural Activity," Advanced Functional Materials, vol., 22, Issue 3, pp. 640-651 (Feb. 8, 2012).
Graz, I. M., et al., "Silicone substrate with in situ strain relief for stretchable thin-film transistors," Applied Physics Letters, vol. 98, pp. 124101-1 to 124101-3 (Mar. 22, 2011).
Guo, L. and DeWeerth, S. P., "High-Density Stretchable Electronics: Toward an Integrated Multilayer Composite," Advanced Materials, vol. 22, Issue 36, pp. 4030-4033 (Sep. 22, 2010).
Hu, L., et al., "Highly conductive paper for energy-storage devices," Proceedings of the National Academy of Sciences, vol. 106, issue 51, pp. 21490-21494 (Dec. 22, 2009).
Hu, W., et al., "An elastomeric transparent composite electrode based on copper nanowires and polyurethane," Journal of Materials Chemistry C, vol. 2, Issue 7, pp. 1298-1305 (Dec. 5, 2013).
International Search Report and Written Opinion issued by the European Patent Office as International Searching Authority for International Application No. PCT/US2013/022593 dated May 7, 2013 (10 pages).
International Search Report and Written Opinion issued by the European Patent Office as International Searching Authority for International Application No. PCT/US2013/028250 dated Aug. 30, 2013 (18 pages).
International Search Report and Written Opinion issued by the U.S. Patent and Trademark Office for International Application No. PCT/US16/13013, dated Nov. 14, 2016 (12 pages).
International Search Report and Written Opinion issued by the U.S. Patent and Trademark Office for International Application No. PCT/US2015/046319 dated Nov. 23, 2015 (10 pages).
International Search Report and Written Opinion issued by the U.S. Patent and Trademark Office for International Application No. PCT/US2015/046350 dated Nov. 27, 2015 (8 pages).
Jeong, G. S., et al., "Solderable and electroplatable flexible electronic circuit on a porous stretchable elastomer," Nature Communications, vol., 3, No. 977, 8 pages (Jul. 31, 2012).
Jiang, H., et al., "Finite deformation mechanics in buckled thin films on compliant supports," Proceedings of the National Academy of Sciences, vol. 104, No. 40, pp. 15607-15612 (Oct. 2, 2007).
Jo, J., et al "Fabrication of Printed Organic Thin-Film Transistors Using Roll Printing," Japanese Journal of Applied Physics, vol. 48, No. 4, pp. 04C181-1-04C181-4, 6 pages (Apr. 20, 2009).

(56) References Cited

OTHER PUBLICATIONS

Jones, J., et al., "Stretchable wavy metal interconnects," J. Vac. Sci. Technol. A, vol. 22, No. 4, pp. 1723-1725 (Jul. 24, 2004).

Kaltenbrunner, M., et al., "Arrays of Ultracompliant Electrochemical Dry Gel Cells for Stretchable Electronics," Advanced Materials, vol. 22, Issue 18, pp. 2065-2067 (May 11, 2010).

Keplinger, C., et al., "Stretchable, Transparent, Ionic Conductors," Science, vol. 341, Issue 6149, pp. 984-987, 6 pages (Aug. 30, 2013).

Kettlgruber, G., et al., "Intrinsically stretchable and rechargeable batteries for self-powered stretchable electronics," Journal of Materials Chemistry A, vol. 1. Issue 18, pp. 5505-5508, 5 pages (Mar. 7, 2013).

Khang, D.-Y., et al., "A stretchable form of single-crystal silicon for high-performance electronics on rubber substrates," Science, vol. 311, pp. 208-212, 6 pages (Jan. 13, 2006).

Kim, D.-H., et al., "Materials and noncoplanar mesh designs for integrated circuits with linear elastic responses to extreme mechanical deformations," Proceedings of National Academy of Sciences, vol. 105, No. 48, pp. 18675-18680 (Dec. 2, 2008).

Koo, H.-J., et al., "Towards All-Soft Matter Circuits: Prototypes of Quasi-Liquid Devices with Memristor Characteristics," Advanced Materials, vol., 23, Issue 31, pp. 3559-3565 (Aug. 16, 2011).

Lacour, S. P., et al,. "An elastically stretchable TFT circuit," Electronic Device Letters, IEEE, vol. 25, Issue 12, pp. 792-794 (Dec. 1, 2004).

Lacour, S. P., et al,. "Stretchable Interconnects for Elastic Electronic Surfaces," Proceedings of the IEEE, vol. 93, Issue 8, pp. 1459-1467 (Aug. 1, 2005).

Lee, M.-T., et al., "Rapid selective metal patterning on polydimethylsiloxane (PDMS) fabricated by capillarity-assisted laser direct write," Journal of Micromechanics and Microengineering, vol. 21, 095018, 9 pages (Aug. 21, 2011).

Lilienthal, A. J., et al., "Airborne Chemical Sensing with Mobile Robots," Sensors, vol. 6, Issue 11, pp. 1616-1678, Nov. 20, 2006.

Liu, X., et al "Paper-based piezoresistive MEMS sensors," Lab on a Chip, vol. 11, pp. 2189-2196 (Jul. 7, 2011).

Martins, R., et al., "Complementary Metal Oxide Semiconductor Technology With and On Paper," Advanced Materials, vol. 23, Issue 29, pp. 4491-4496 (Oct. 18, 2011).

Mazzeo, A. D., et al., "Paper-Based, Capacitive Touch Pads," Advanced Materials, vol. 24, pp. 2850-2856 (Apr. 27, 2012).

Monkman, G. J., "An Analysis of Astrictive Prehension," The International Journal of Robotics Research, vol. 16, No. 1, pp. 1-10 (Feb. 1, 1997).

Monkman, Gareth, "Electroadhesive microgrippers", Industrial Robot: An International Journal, vol. 30 Iss: 4, pp. 326-330, 7 pages (Jul. 2, 2003).

Nyholm, L., et al., "Toward Flexible Polymer and Paper-Based Energy Storage Devices," Advanced Materials, vol. 23, Issue 33, pp. 3751-3769 (Sep. 1, 2011).

Prahald, H., et al., "Electroadhesive Robots-Wall Climbing Robots Enabled by a Novel, Robust, and Electrically Controllable Adhesion Technology," IEEE International Conference on Robotics and Automation, Pasadena, CA, pp. 3028-3033 (May 19-23, 2008).

Sekitani, T., et al., "A Rubberlike Stretchable Active Matrix Using Elastic Conductors," Science, vol. 321, Issue 5895, pp. 1468-1472, 7 pages (Sep. 12, 2008).

Sekitani, T., et al., "Organic transistors manufactured using inkjet technology with subfemtoliter accuracy," Proceedings of the National Academy of Sciences, vol. 105, No. 31, pp. 4976-4980 (Apr. 1, 2008).

Sekitani, T., et al., "Stretchable active-matrix organic light-emitting diode display using printable elastic conductors," Nature Materials, vol. 8, pp. 494-499, 8 pages (May 10, 2009).

Siegel, A. C., et al., "Foldable Printed Circuit Boards on Paper Substrates," Advanced Functional Materials, vol. 20, pp. 28-35 (Jan. 8, 2010).

Sirringhaus, H., et al., "High-Resolution Inkjet Printing of All-Polymer Transistor Circuits," Science, vol. 290, Issue 5499, pp. 2123-2126, 6 pages (Dec. 21, 2000).

Someya, T., et al., "Conformable, flexible, large-area networks of pressure and thermal sensors with organic transistor active matrixes," Proceedings of the National Academy of Sciences, vol. 102, No. 35, pp. 12321-12325 (Aug. 30, 2005).

Tian, H., et al., Graphene-on-Paper Sound Source Devices, ACS Nano, vol. 5, No. 6, pp. 4878-4885 (May 19, 2011).

Verilhac, J.-M., et al., "Step toward robust and reliable amorphous polymer field-effect transistors and logic functions made by the use of roll to roll compatible printing processes," Organic Electronics, vol. 11, Issue 3, pp. 456-462 (Mar. 1, 2010).

Weng, Z., et al., "Graphene-Cellulose Paper Flexible Supercapacitors," Advanced Energy Materials, vol. 1, Issue 5, pp. 917-922, 6 pages (Sep. 16, 2011).

Xu, S., et al., "Stretchable batteries with self-similar serpentine interconnects and integrated wireless recharging systems," Nature Communications, vol. 4, No. 1543, 8 pages (Feb. 26, 2013).

Zschieschang, U., et al., "Organic Electronics on Banknotes," Advanced Materials, vol. 23, Issue 5, pp. 654-658 (Feb. 1, 2011).

Ficuciello, "Modelling and Control for Soft Finger Manipulation and Human-Robot Interaction," Ph.D. Thesis, University of Naples Federico II, Nov. 2010, 89 pages.

Park et al., "Exoskeletal Force-Sensing End-Effectors With Embedded Optical Fiber-Bragg-Grating Sensors," IEEE Transactions on Robotics, Dec. 2009, vol. 25, No. 6, pp. 1319-1331.

* cited by examiner

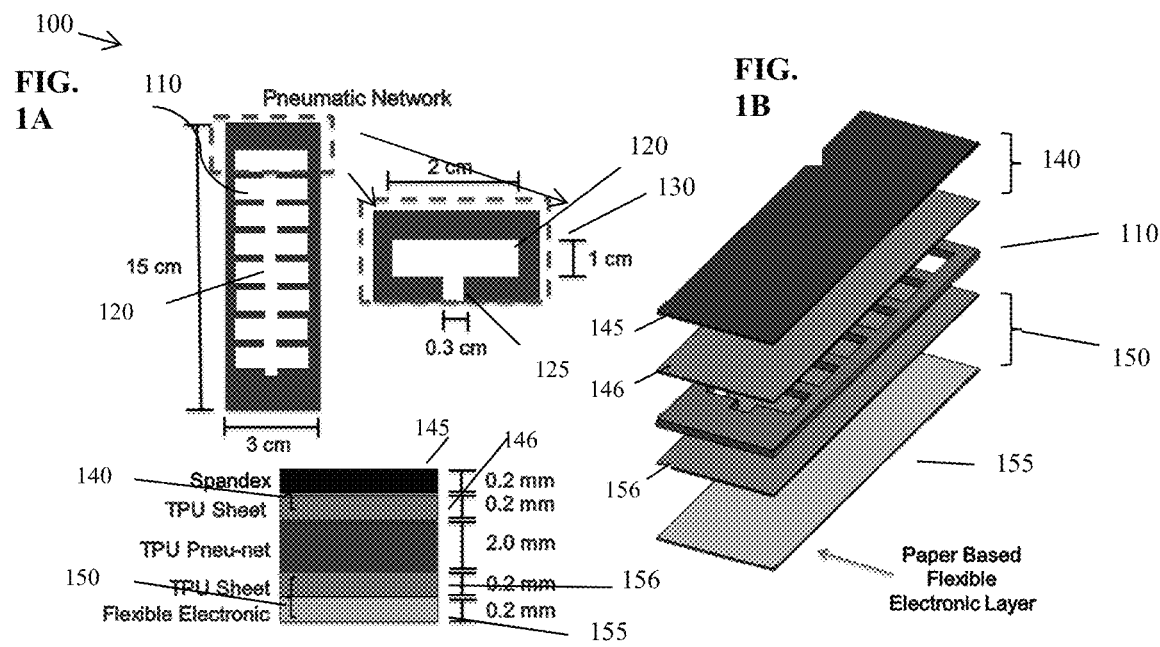
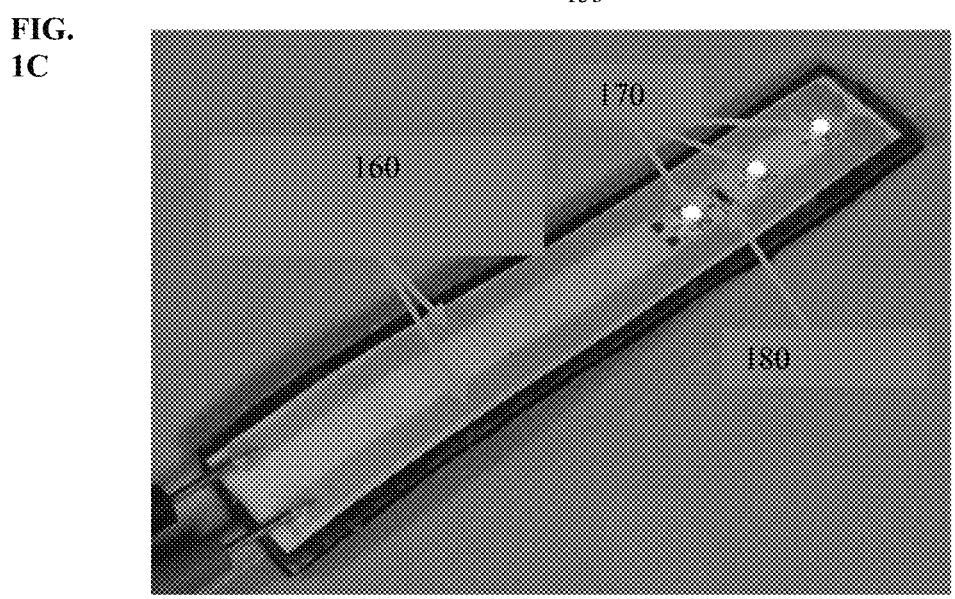
FIG. 1A
FIG. 1B
FIG. 1C

— ■ — before hammering

— ● — after ten hammer impacts

FIG. 5A
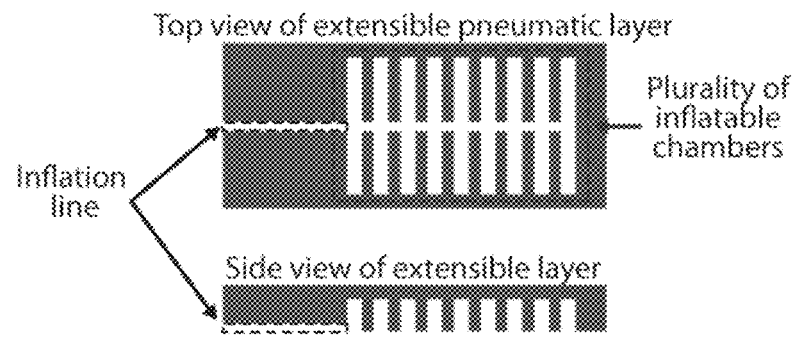
FIG. 5B
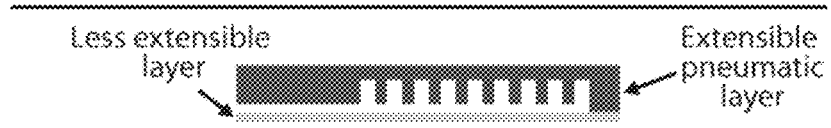
FIG. 5C
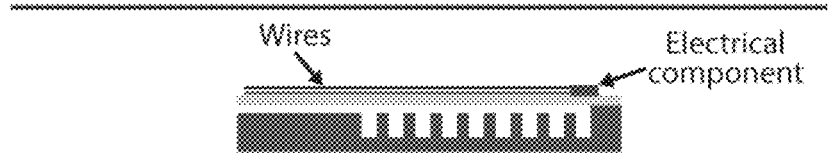
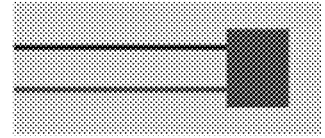
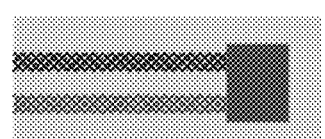
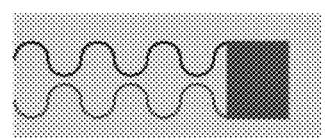
FIG. 5D
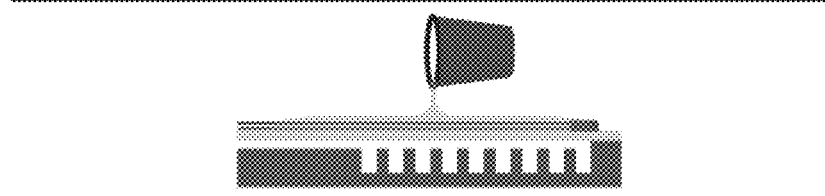
FIG. 5E

FIG. 6A
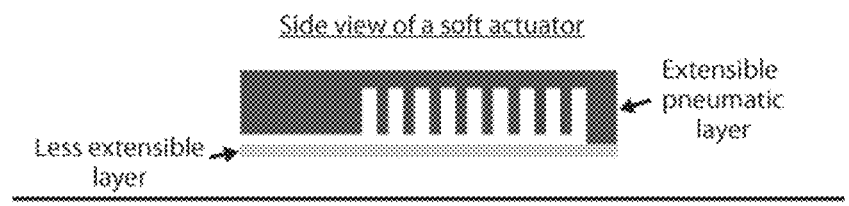
FIG. 6B
i)
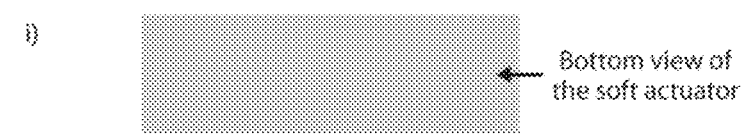
ii)
iii) Thermal evaporation of chromium to promote adhesion followed by evaporation of gold
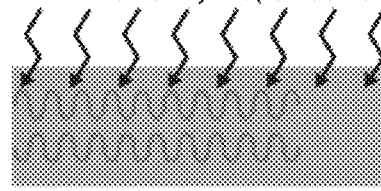
FIG. 6C
Lithographically patterned serpentine wires on a soft actuator
FIG. 6D
Side view of a soft actuator with attached electronics
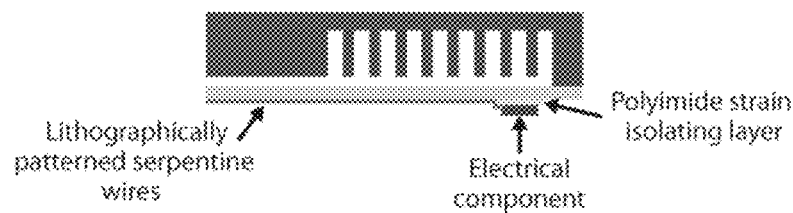

Lithographically patterned serpentine wire on a soft actuator

Addition of a second lithographically patterned serpentine wire, layer of conductive ink and layer of elastomer to the soft actuator FIG. 8A    Side view of the extensible pneumatic layer of a soft actuator
FIG. 8B
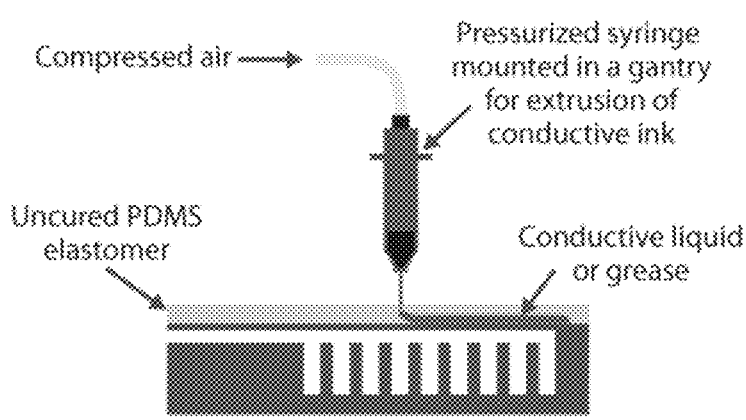
FIG. 8C    Soft actuator with embedded liquid after curing
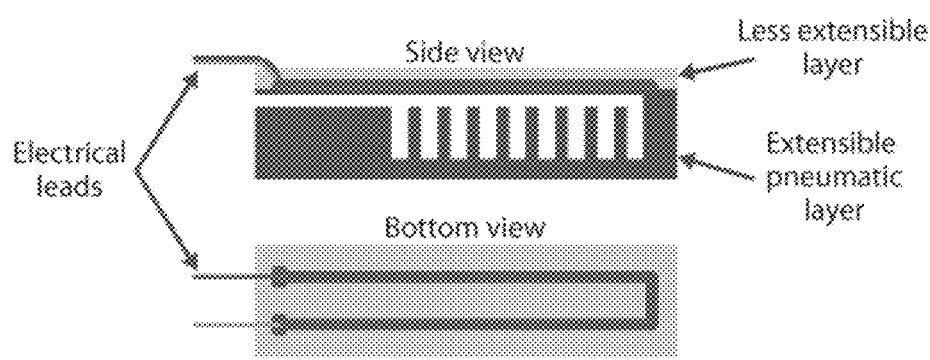

Electroadhesive pad generated by laser sintering Ag onto PDMS

Addition of a PDMS dielectric layer

Soft actuator with embedded electroadhesive pad

FIG. 12A Four soft batteries connected in parallel on the less extensible layer of a soft actuator
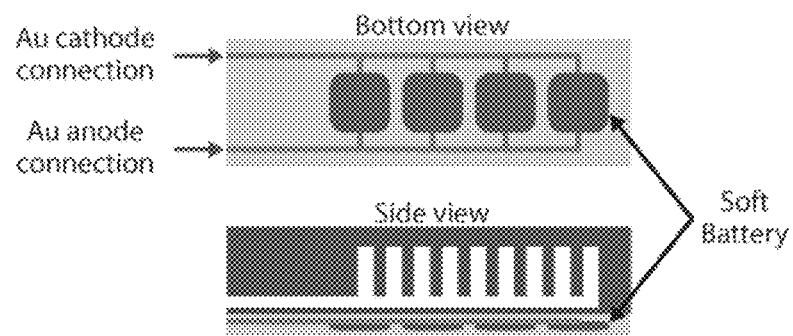
FIG. 12B Construction of a soft battery
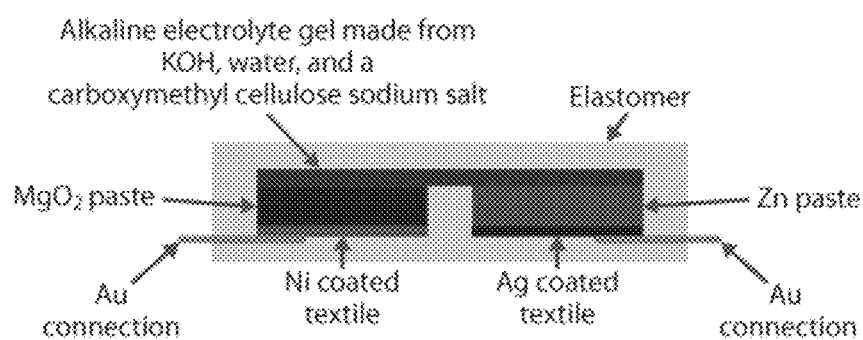

FLEXIBLE AND STRETCHABLE ELECTRONIC STRAIN-LIMITED LAYER FOR SOFT ACTUATORS

RELATED APPLICATIONS

The application is a continuation of U.S. patent application Ser. No. 14/832,071, filed on Aug. 21, 2015, which claims the benefit of priority under 35 U.S.C. § 119(e) to U.S. Provisional Application No. 62/040,905, filed Aug. 22, 2014, the contents of which are incorporated by reference.

STATEMENT OF FEDERAL SUPPORT

This invention was made with government support under DARPA grant number W911NF-11-1-0094 awarded by the Department of Defense and under grant number DMR-0820484 awarded by the National Science Foundation. The government has certain rights in the invention.

INCORPORATION BY REFERENCE

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

This technology relates generally to soft robot actuators that integrate electronic circuitry.

BACKGROUND

Machines, whether they are hard or soft, typically require the integration of electrical components (e.g. motors, sensors, microcontrollers, displays, pumps, batteries, etc.) in order to perform sophisticated tasks. As most electrical components are made from ridged materials, they are difficult to integrate into the bodies of soft actuators which stretch and flex during operation. This limitation is a substantial technical hurdle to advancing the field of soft robotics.

SUMMARY

A soft robot having integrated electrical circuitry and/or electronic device incorporated into a flexible and/or stretchable electronic straining limiting layer. Since the strain limited layer of a soft actuator experiences the smallest strain during device operation, electrical components can be located in this layer with the expectation that they will experience a minimum of stretch or displacement during operation. For ease of reference, a soft robot having integrated electrical circuitry and/or electronic device incorporated into a flexible electronic straining limited layer is referred to as an "electronic soft robot."

In one aspect, a soft robot having integrated electrical circuitry includes an elastomeric body having at last one chamber disposed within the body, the elastomeric body comprising a pressurizing inlet that is configured to receive fluid for the plurality of interconnected chambers; and a strain limited layer disposed along one side of the flexible body, wherein the strain limited layer includes at least one electrical component.

In one or more embodiments, the strain limited layer is inextensible, or the strain limited layer can accommodate strain of less than 35% or less than 40% or less than 50%, and for example can be in the range of 0.1-50% strain. In one or more embodiments, the strain limiting layer is greater than 10% or greater than 50% or greater than 100% or greater than 500% stiffer than the expandable, elastomeric body.

In any of the preceding embodiments, electrical component is selected from conductive lines, electrodes, transistors, photovoltaics, electrochemical detectors, batteries, electroadhesive pads, displays, electromechanical transducers, speakers, microphones, photo detectors, antennas, oscillators, inductors, inductive heaters, capacitors, supercapacitors, electromagnets, resistors, resistive heaters, relays, photovoltaics, rectifiers, diodes, zener diodes, LEDs, OLEDs, CCDs, pneumatic or hydraulic pumps, solenoid valves, electroactive diaphragm valves, microcontrollers, logic gates, amplifiers, operational amplifiers, switches, global positioning systems, wheatstone bridges, band-pass filters, low-pass filters, high-pass filters, RFID tags, spark generators, power inverters, analog to digital converters, optical imaging devices, thermal imaging devices, nitinol actuators, and sensors.

In any of the preceding embodiments, the sensor is one or more of thermal sensors, strain sensors, chemical sensors, biological sensors, neural sensors, pressure sensors, barometric pressure sensors, vacuum sensors, altimeters, conductivity sensors, impedance sensors, inertial measurement units, force sensing resistors, laser range finders, acoustic range finders, magnetometers, Hall Effect sensors, magnetodiodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX gas sensors, sarin gas sensors, mustard gas sensors, explosives detectors, metal detectors, radiological detectors, and current sensors.

In any of the preceding embodiments, the flexible body is molded, or the flexible body comprises a laminate.

In any of the preceding embodiments, the soft robot further includes a control system for controlling the motion of the soft robot based at least in part on data obtained from one or more sensors located on the strain limited layer.

In one or more embodiments, a variety of electrical components can be incorporated into the body of a soft actuator by constructing a flexible and optionally stretchable electronic strain limited layer is disclosed. The soft actuator incorporates both a highly extensible and a less extensible elastomer; and a plethora of electrical components that can accommodate zero to moderate strains can be included in the electronic strain limited layer. Exemplary non-limiting examples of electrical components include flexible and/or stretchable as well as rigid embodiments of common electronic devices (e.g. transistors, displays, batteries, electromechanical transducers, speakers, thermal sensors, strain sensors, pressure sensors, myoelectric sensors, photo detectors, etc.).

In one or more embodiments, a flexible electronic component is used as a load bearing element which serves the role of the strain limited layer in a soft actuator. In some embodiments, the strain limited layers are inextensible.

In another aspect, a soft robot is described, having an integrated electrical component including an expandable or collapsible body, the body comprising an inlet that is configured to communicate with a fluid source; and a flexible strain limited layer secured to a portion of the expandable or collapsible body, wherein the strain limited layer includes at least one electrical component.

In one or more embodiments, the strain limited layer is inextensible.

In one or more embodiments, the strain limited layer can accommodate strain of less than 35% or less than 40% or less than 50%, and for example can be in the range of 0.1-50% strain.

In one or more embodiments, the electrical component includes a device capable of measurement of a voltage, current, or an impedance.

In one or more embodiments, the electrical component includes a device capable of amplification, attenuation, filtering, or switching of electronic signals.

In one or more embodiments, the electrical component includes a device capable of mechanical or electrical work in response to a change in supplied voltage and/or current.

In any preceding embodiment, the electrical component includes a device that emits radiation in response to a change in supplied voltage and/or current.

In any preceding embodiment, the electrical component includes a device that changes temperature in response to a change in supplied voltage and/or current.

In any preceding embodiment, the strain limited layer includes of two or more layers and electrical components are located in at least two layers, and for example, the electrical components on different layers are interconnected using electrical vias and optionally the electrical components are configured to function as a capacitor.

In any preceding embodiment, wherein the expandable or collapsible body comprises a plurality of expandable or collapsible fluidly interconnected chambers, and inlet is configured to communicate with all or a subset of the plurality of expandable interconnected chambers.

In any preceding embodiment, the expandable or collapsible body includes one or more elastomeric chambers configured to inflate upon fluidic pressurization or collapse upon depressurization.

In any preceding embodiment, the expandable or collapsible body includes one or more flexible or extensible chambers configured to open or unfold upon fluidic pressurization or close or fold upon application upon depressurization.

In any preceding embodiment, the expandable body is a molded body.

In any preceding embodiment, the expandable body comprises a laminate body.

In any preceding embodiment, the electrical component comprises lithographically defined wires disposed on the strain limiting layer.

In any preceding embodiment, wherein the electrical component includes serpentine conductive wires.

In any preceding embodiment, the electrical component on the strain limited layer includes a conductive trace conformly secured to a buckled strain limited layer.

In any preceding embodiment, wherein the electrical component is selected from conductive lines, electrodes, transistors, photovoltaics, electrochemical detectors, batteries, supercapacitors, neural sensors, electroadhesive pads, displays, electromechanical transducers, speakers, microphones, photo detectors laser range finders, acoustic range finders antennas, oscillators, inductors, inductive heaters, capacitors, supercapacitors, electromagnets, resistors, resistive heaters, relays, photovoltaics, rectifiers, diodes, zener diodes, LEDs, OLEDs, CCDs, pneumatic or hydraulic pumps, electroactive diaphragm valves, solenoid valves, microcontrollers, logic gates, amplifiers, operational amplifiers, switches, global positioning system, wheatstone bridges, band-pass filters, low-pass filters, high-pass filters, RFID tags, spark generators, power inverters, analog to digital converters, thermal imaging and sensors.

In any preceding embodiment, sensors, pressure sensors, barometric pressure sensors, vacuum sensors, altimeters, conductivity sensors, impedance sensors, inertial measurement units, force sensing resistors, laser range finders, acoustic range finders, magnetometers, hall effect sensors, magneto-diodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors, electronic noses, gas sensors, oxygen sensors, nitrogen sensors, natural gas sensors, VX sensors, sarin sensors, mustard gas sensors, tabun sensors, soman sensors, phosgene sensors, chlorine gas sensors, explosives detectors, acetone sensors, potassium nitrate sensors, potassium perchlorate sensors, ammonia sensors, narcotics sensors, metal detectors, radiological detectors, and current sensors.

In any preceding embodiment, the soft robot of the invention described herein is disclosed, wherein the electrical components incorporated into the strain limiting layer are adapted to function as transistors, audio speakers, soft strain sensors, capacitive touch sensors, LEDS, neural sensors, pressure and thermal sensors, batteries or electroadhesion devices.

In yet another aspect, a method of operating a soft robot is described, comprising:

providing a soft robot according to one or more embodiments; and pressurizing or depressurizing the expandable or collapsible body to actuate the soft robot;

providing an input to the electrical component located on the strain limiting layer, wherein the electrical component responds to the input to affect electrons or their associated fields, or whose behavior or physical state is altered by electrons or their associated field.

In one or more embodiments, the electrical component measures a voltage, current, or an impedance.

In one or more embodiments, wherein the electrical component amplifies, attenuates, filters, or switches electronic signals.

In one or more embodiments, the electrical component does mechanical or electrical work in response to a change in supplied voltage and/or current.

In one or more embodiments, the electrical component emits radiation, such as an LED, in response to a change in supplied voltage and/or current.

In one or more embodiments, the electrical component changes temperature in response to a change in supplied voltage and/or current.

In one or more embodiments, the electrical components function as transistors, audio speakers, soft strain sensors, capacitive touch sensors, LEDS, neural sensors, pressure and thermal sensors, batteries or electroadhesion devices.

BRIEF DESCRIPTION OF THE FIGURES

FIG. 1A is a schematic diagram outlining the construction of a pneumatic soft, bending actuator according to one or more embodiments that uses a flexible electronic incorporated into its strain limited layer.

FIG. 1B is an exploded view of a pneumatic soft, bending actuator that uses a flexible electronic incorporated into its strain limited layer.

FIG. 1C is a photograph of the soft bending actuator with illuminated LEDs.

FIGS. 2A and 2B are schematic diagrams outlining the fabrication of a pneumatic soft manipulator with integrated curvature sensors, in which FIG. 2A shows a sheet of blended polyester/cellulose paper dressed with adhered aluminum electrodes and stencil-printed composite material, consisting of carbon black mixed with polydimethylsiloxane (c-PDMS), sensors to make a paper based flexible electronic; and FIG. 2B shows the placement of the Ecoflex pneumatic layer in contact with the flexible electronic which is soaked with uncured elastomer, followed by thermal curing of the assembly.

FIGS. 3A-3M illustrate the operation of a hand-like soft robotic gripper including an embedded electrical component, in which FIG. 3A is a top-view of the soft robotic actuator;

FIG. 3B is a bottom-view of the same device; FIGS. 3C-3G show actuation of individual fingers by the controlled inflation of the different pneumatic channels; and FIGS. 3H-3M are series of time delayed photographs of the manipulator picking up an uncooked egg.

FIGS. 5A-5E illustrate the incorporation of conductive wires into the strain limited layer of a soft robot, in which FIG. 5A is a top view and side view of the extensible pneumatic layer used in the preparation of a soft actuator robot; FIG. 5B is a side view of molded or channel cut soft robot, including a strain limited layer; FIG. 5C shows the application of conductive circuits to inextensible layer; FIG. 5D shows the encapsulation of conductive circuit in flexible polymer; and FIG. 5E illustrates the thermally cured assembly incorporating conductive circuit in strain limited layer; the layer can have moderate extension capability as the layer is made from an elastomer.

FIGS. 6A-6D illustrate an exemplary electronic soft actuator incorporating serpentine wires according to one or more embodiments in which FIG. 6A is a cross-sectional illustration of the electronic soft actuator; FIG. 6B is a schematic illustration showing deposition process by thermal evaporation to deposit serpentine wires on the strain-limited layer of the electronic soft actuator; FIG. 6C is a plan view of the serpentine wires on the strain-limited layer of the electronic soft actuator; and FIG. 6D is side view of the electronic soft actuator with attached electronics.

FIGS. 7A-7D illustrate an exemplary electronic soft actuator having electronic components incorporating a soft strain sensor, speaker, microphone, touch sensor, mechanical transducer, capacitor, or pressure sensor according to one or more embodiments, in which FIG. 7A is a schematic illustration of a lithographically patterned wire on a strain limited layer; FIG. 7B is a schematic illustration of the conductive ink printing of an electrical component FIG. 7C is a schematic illustration showing the encapsulation of the electrical components in elastomer; and FIG. 7D is a bottom plan view and side view of the electronic soft actuator having electronic showing stacked electrical components according to one or more embodiments.

FIGS. 8A-8C is an exemplary electronic soft robot having electronic components prepared using omnidirectional printing according to one or more embodiments, in which FIG. 8A is a schematic illustration of the extensible pneumatic layer used in the preparation of a soft actuator robot; FIG. 8B is a cross-sectional view of process used to deposit a conductive trace; and FIG. 8C is a bottom plan view and side view of the electronic soft actuator having electronic showing stacked electrical components according to one or more embodiments.

FIGS. 9A-9D illustrate an exemplary electronic soft robot with electroadhesive pads according to one or more embodiments, in which FIG. 9A shows sintering of a silver conductive trace on a plasma treated elastomer sheet partially submerged in a silver nanoparticle solution; FIG. 9B is a plan view of the sintered traces, with an exploded view showing the interdigitated fingers of the sintered electrode; FIG. 9C is a schematic illustration showing encapsulation of the sintered electrode in a PDMS dielectric layer; And FIG. 9D is a cross-sectional view of a device containing an electroadhesion pad in the strain limited layer.

FIGS. 12A and 12B illustrate an exemplary electronic soft robot incorporating a soft battery according to one or more embodiments.

DETAILED DESCRIPTION

A soft robot having integrated electrical circuitry can be made from an expandable body, the body having a pressurizing inlet that is configured to communicate with a fluid source; and a strain limited layer secured to a portion of the expandable body. The strain limited layer includes at least one electrical component. An electronic component is any device or physical entity used to affect electrons or their associated fields, or whose behavior or physical state is altered by electrons or their associated fields. For example, the device or physical entity can measure a voltage, current, or an impedance. An electronic component also includes a device or physical entity that amplifies, attenuates, filters, or switches electronic signals. An electronic component also includes a device or physical entity that does mechanical or electrical work in response to a change in supplied voltage and/or current. An electronic component also includes a device or physical entity that emits radiation, such as an LED, in response to a change in supplied voltage and/or current. An electronic component also includes any device or physical entity that changes temperature in response to a change in supplied voltage and/or current.

Exemplary electrical components include conductive lines, electrodes, transistors, photovoltaics, electrochemical detectors, batteries, electroadhesive pads, displays, electromechanical transducers, speakers, microphones, photo detectors, antennas, oscillators, inductors, inductive heaters, capacitors, supercapacitors, electromagnets, resistors, resistive heaters, relays, photovoltaics, rectifiers, diodes, zener diodes, LEDs, OLEDs, CCDs, pneumatic or hydraulic pumps, solenoid valves, electroactive diaphragm valves, microcontrollers, logic gates, amplifiers, operational amplifiers, switches, global positioning systems, wheatstone bridges, band-pass filters, low-pass filters, high-pass filters, RFID tags, spark generators, power inverters, analog to digital converters, optical imaging devices, thermal imaging devices, nitinol actuators, and sensors.

Figure 14A:
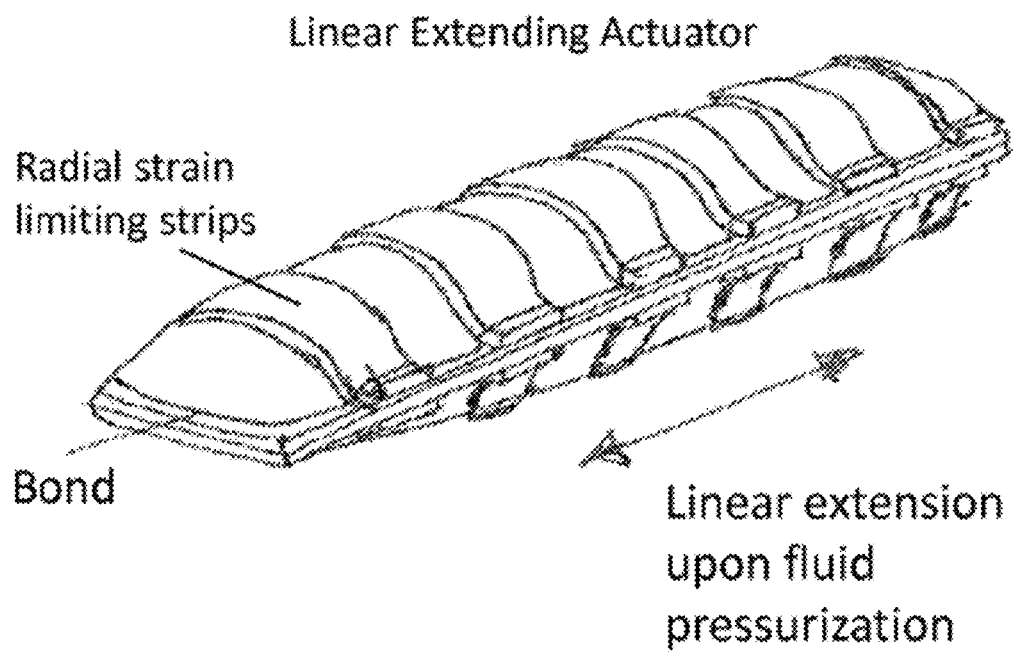
FIG. 14A is a perspective view of the linear actuator extending under fluid pressurization where the strain limited strips, connected by the bond, form radial strain limited hoops along the length of the actuator, and thus promote linear extension.
Figure 14B:
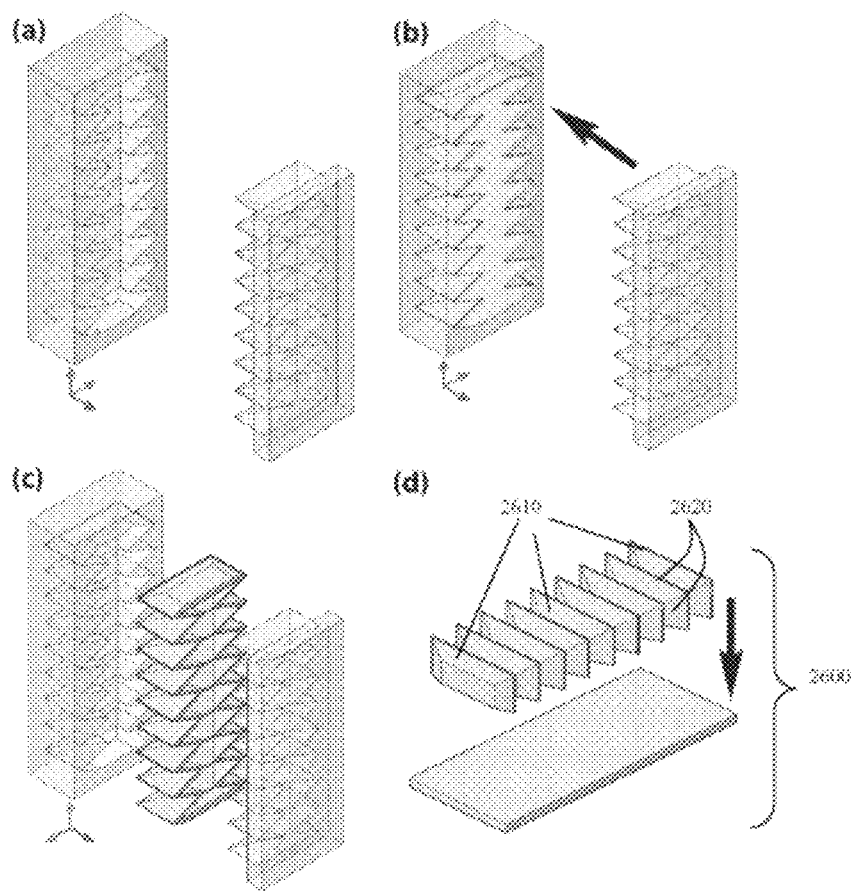
FIG. 14B illustrates the structure and manufacture of a pleated pneumatic network device, in which (a) is a two part mold for soft lithography of pleated, bellow structures; (b) illustrates Kevlar™/Ecoflex™ pressed into mold and (c) shows a replicated Kevlar™/Ecoflex™ bellow [arrows indicate direction in which the (b) mold is applied; (c) a perspective view of the assembly of a pleated pneumatic network device including a series of interconnected pleated chambers and a strain resistance sheet, and (d) sealing of the bellow against a Kevlar™/Ecoflex™ flat [arrows indicate direction in which the bellow is applied.
Figure 14C:
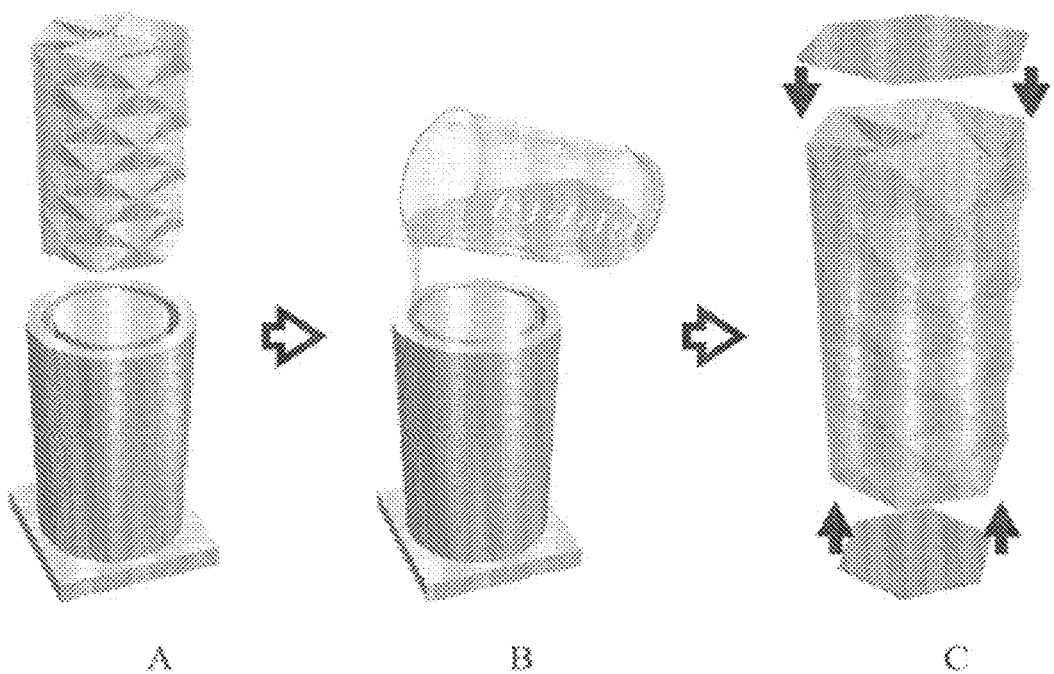
FIG. 14C is a schematic diagram illustrating a process to fabricate an elongation actuator with paper folded into a bellows-like pattern around a cylindrical pneumatic channel according to one or more embodiments, in which (A) the folded paper with the fold pattern shown is first inserted into a cylindrical mold, (B) an elastomer pre mixture is then poured into the mold, and cured with the patterned paper embedded; and (C) the pneumatic channel is completed by sealing the top and bottom faces of the pneumatic channel.

The actual construction of the soft robot is non-limiting and the expandable body can be, for example, made from a plurality of expandable fluidly interconnected chambers; where the pressurizing inlet is configured to communicate with the plurality of expandable interconnected chambers, or made using one or more elastomeric chambers configured to balloon upon fluidic pressurization. In other embodiments, the expandable body is made from one or more flexible or extensible chambers configured to unbend or unfold upon fluidic pressurization. In other embodiments, a strain limiting layer can be wrapped around the body in a helix to form a twisting actuator. See WO 2012/148472; International Application No. PCT/US13/28250 filed Feb. 28, 2013; International Application No. PCT/US13/22593 filed Jan. 22, 2013 and U.S. Provisional application Ser. No. 61/885,092, filed Oct. 1, 2013, and FIGS. 14A-14C, for non-limiting description of soft actuators suitable for use in the current invention, the contents of which are incorporated by reference.

As used herein, a soft actuator contains at least one chamber that responds to a signal to perform motion. A system of actuators can be integrated together to form a device, like a soft tentacle. A soft robot can be composed of a single actuator or device, or a multitude of actuators or devices that optionally have a control and/or computational function embedded within the robot itself or linked in some way. As used herein, reference to a 'robot' can include the embodiment of a single actuator or a system of actuators made with a collection of soft actuators. A soft robot can be composed of a single soft actuator or several soft actuators with additional capabilities combined.

In certain embodiments, soft robots have embedded channels or networks of channels in a soft elastomer that can be pressurized to provide large and versatile actuation. The soft robot actuators can be made of a soft rubber (e.g., elastomer) that defines the channels. The soft robots also include a stiffer, yet still pliable, e.g., bendable, strain limiting layer, typically extending along one side of the channel network. A high elastic modulus material can be used for sections of the network where inflation is undesirable, while a low elastic modulus material can be used for sections of the network where extensibility is needed. Upon pressurization of the channels via air (pneumatic) or fluid (hydraulic) or depressurization of the channels by vacuum, the elastomer network expands, or contracts in the case of depressurization, and the elastomer's expansion or contraction, respectively, is accommodated by bending around the stiffer, strain limiting layer in the case of pressurization and around the elastomer network in the case of depressurization. In other embodiments, soft robots can include chambers that unfold or unbend when actuated. In such instances, the soft robot can be made of a flexible, but inextensible material, as expansion is accommodated by unfolding or unbending of the actuator around the strain limiting layer in the case of pressurization and contraction is accommodated by increased folding or bending around the folded layer of the actuator in the case of vacuum application. In one or more embodiments, electronic circuitry and electronic devices, such as sensors, electrodes, transistors, displays, batteries, electromechanical transducers, speakers, thermal sensors, strain sensors, pressure sensors, photo detectors, and the like, are incorporated into the strain limiting layer of the soft robot actuator.

Strain is a description of deformation in terms of relative displacement of a body. A deformation results from a stress induced by applied forces, in the case here, for example, by the pressurizing force. Because materials of lower stiffness or smaller elastic modulus will deform to a greater degree than the higher elastic modulus materials, the low stiffness materials experience more strain or deformation. As a result, the strain in the material of higher stiffness or greater elastic modulus is smaller or "limited." As used herein, the layer or wall or portion thereof the soft robot that extends, bends, expands or unfolds at lower threshold force is the 'extensible' or 'low strain' member. The layer or wall or portion thereof the soft robot that extends, bends, expands or unfolds at higher threshold force is referred herein to the "strain limited" layer or wall or membrane. The element is also alternatively referred to as a "strain limiting" member. In one or more embodiments, the strain limiting layer is greater than 10% or greater than 50% or greater than 100% or greater than 500% stiffer (a range bounded by any of the values noted hereinabove) than the expandable, elastomeric body. In some embodiments, the strain limited layers can accommodate moderate strains (e.g., <35% or 1-5%, 5-10%, 10-15%, 15-20%, 20-25%, 25-30%, or a range bounded by any of the values noted hereinabove).

In one or more embodiments, the soft robot can include different materials, one material forming the actuating wall and/or chambers and another material forming the strain-limiting wall. For example, the actuating wall and/or chambers can be molded from a curable elastomer, prepared using 3D printing or lithography, or can be assembled by stacking thermoset elastomer sheets. The strain limiting layer can be applied to one side of the assembled channel network. The list of materials that can be used with this technique is extensive and encompasses elastomers such as latex, polyurethanes, silicones, vulcanized rubber for the extensible materials, and fabrics such as paper, Kevlar©, cotton, nylon, a relatively stiffer elastomer, etc. for the strain limiting membrane. Composites using paper, textiles, carbon-, glass- or metal fiber as stiffer materials incorporated into the strain limiting layer are possible.

In one or more embodiments, the strain limiting layer is substantially inextensible, but flexible. For example, the layer can include reinforcing fibers such as paper, e.g., cellulosic fibers, or Kevlar, e.g., polyaramid fibers. In one or more embodiments, the strain limiting layer can be formed from silicon infused paper, polyester, polyethylene or polyaramid (Kevlar®) sheet. In other embodiments, the strain limiting layer can exhibit limited or moderate strain, but in any case extensibility that is less than the elastomeric pneumatic network. By way of example, the strain limiting member can be silicone or polyurethane elastomers with a Shore A hardness of 30-80. For example, if the strain limiting layer has a Shore A of 1.4-1.6 times the Shore A of the extensible layer it produces a predominately bending actuator with some extension, where for example between 1.0-1.4 times produces an extending actuator with a little bend and >1.6 times produces a bending actuator with almost no extension. In one or more embodiments, both the strain limiting layer and extensible layer are made using the same kind of polymer, for example, silicone goes with silicone and polyurethane is paired with polyurethanes.

In one or more embodiments, the expandable body and the strain limited layer can include the same materials. Even if the material used to make the strain limiting layer is the same as that used to make the pneumatic chambers it can still be strain limiting. For example the strain limiting layer can be thicker than the pneumatic layer and as a result it would be much harder to stretch the thick strain limiting layer relative to the thin pneumatic layer. In another example the pneumatic layer could have an accordion bellows or origami like folded structure and the strain limiting layer is a flat wall. In this case even though both the pneumatic layer and the strain limiting layer are made out of the same stiffness material the folded accordion or origami pneumatic layer would unfurl and bend around the flat slab used for the strain limiting layer upon pressurization since it is easier to unfold a rubber than stretch a rubber. In another embodiment, the same elastomer is used for the strain limiting layer and the pneumatic layer, but the strain limiting layer further includes fiber pulp so that the resulting cured composite is stiffer than the pure unadulterated elastomer used to make the pneumatic layer. Alternatively the strain limiting layer could just be made from a stiffer elastomer for its construction relative to the elastomer used to make the pneumatic layer.

The electrical component can be engineered to tolerate a limited amount of strain. By way of example, the strain limiting layers can accommodate moderate strains (<50%). Since it is possible to construct a soft actuator by combining both a highly extensible and a less extensible elastomer and since a plethora of electrical components have been developed that can accommodate moderate strains, a soft actuator with a stretchable electronic strain limiting layer is contemplated.

In some embodiments, for example where electrical components cannot tolerate any or little strain, a strain isolating layer can be employed. A strain isolating layer can be a rigid element that is disposed between the electrical component and the underlying strain-limited layer. The strain isolating layer serves to restrict stretching of the strain limited layer located under the rigid electrical device. Typically polyimide foils like Kapton can be used as the strain isolating layer. FIGS. 6 and 10 are examples of strain limiting layers using rigid components. The polyimide strain isolating layer in these examples serves as a strain isolating element for the purpose of mounting hard electronics FIG. 1A is an illustration of an exemplary electronic soft robot 100 incorporating circuitry and/or electronic components into the strain limiting layer according to one or more embodiments. In the current embodiment, the device includes a number of layers that are stacked to form a laminate soft actuator; however, the soft actuator can be made using any suitable method, including without limitation 3D printing, molding, thermoforming, photolithography and the like. In the current exemplary embodiment, a soft electronic actuator is prepared using thermally mated materials, in this case thermoplastic polyurethane (TPU) sheets. The stacked soft actuator includes a central pneumatic network layer 110 prepared from thermoplastic elastomer such as thermoplastic polyurethane (TPU). The pneumatic layer includes a number of chambers 120 fluidically interconnected by interconnector 125. FIG. 1A shows an enlarged view of a single chamber detailing the chamber 120 and chamber interconnect 125. The central pneumatic network layer 110 of electronic soft robot 100 is flanked on either side by TPU-backed sheets 140 and 150. TPU-backed sheet 140 includes a flexible, expandable layer 145, such as spandex or latex, heat bonded to a TPU sheet 146. The TPU-backed sheet 150 includes an inextensible or moderately extensible sheet 155 that includes the electronic circuitry heat bonded to a TPU sheet 156. The sheets can vary in thickness and are selected to provide the balance of elasticity and strength desired for the electronic soft robot. FIG. 1B is an exploded view of the sheets used to form the electronic soft robot. FIG. 1C is a photograph of an electronic soft robot including LED illumination on the strain limiting layer having the layers described in FIGS. 1A and 1B.

Loading the device electronics on the strain limiting layer provides the dual advantages of limiting the amount of strain likely to be experienced by electronic circuitry and providing a strain limiting layer to effect actuation. This reduces the amount of 'real estate' that needs to be provided to accommodate the electronics, as the strain limiting layer serves the dual role of actuator and circuit board. In addition, it is possible to provide a multilayer or tiered arrangement of the electronic components to further reduce the space requirements for the electronic device, while also permitting more complex devices to be introduced into the soft robot. See, High-Density Stretchable Electronics: Toward an Integrated Multilayer Composite, Adv Mater 22, 4030-4033 (2010), which is incorporated by reference in its entirety.

The electrical components incorporated into the strain limiting layer can be adapted to function as supercapacitors, such as described PNAS 106 (51), 21490-21494 (2009); Adv Mater 23, 3751-3769 (2011); Adv Energy Mater 1, 917-922 (2011), displays such as described in Adv Mater 14, 1460-1464 (2002); Nat Mater 8, 494 (2009) and Science 321, 1468 (2008).

The electrical components incorporated into the strain limiting layer can be adapted to function as photovoltaic devices such as described Adv Mater 23, 3500-3505 (2011).

The electrical components incorporated into the strain limiting layer can be adapted to function as transistors such as described in Jpn J Appl Phys 48 04C181 2009; Adv Mater 23 4491-4496 2011; PNAS 105 4976-4980 2008; Science 290 2123-2126 2000; Org Electron 11 456-462 2010; Appl Phys Lett 98 124101 2011; Adv Mater 23 654-658 2011; or IEEE Electron Device Lett 25 792-794 2004.

The electrical components incorporated into the strain limiting layer can be adapted to function as audio speakers such as described in ACS Nano 5 4878-4885 2011 or Science 341 984-987 2013.

The electrical components incorporated into the strain limiting layer can be adapted to function as soft strain sensors such as described in Lab Chip 11 2189-2196 2011 or Adv Mater 2014.

The electrical components incorporated into the strain limiting layer can be adapted to function as flexible capacitive touch sensors such as described in Adv Mater 24 2850-2856 2012.

The electrical components incorporated into the strain limiting layer can be adapted to function as paper and elastomer mounted LEDS such as described in Adv Funct Mater 20 28-35 2010; Adv Mater 22 4030-4033 2010 or Nat Commun 3 977 2012.

The electrical components incorporated into the strain limiting layer can be adapted to function as soft neural sensors such as described in Adv Funct Mater 22 640-651 2012.

The electrical components incorporated into the strain limiting layer can be adapted to function as soft pressure and thermal sensors such as described in PNAS 102 35 12321-12325 2005.

The electrical components incorporated into the strain limiting layer can be adapted to function as soft photodetectors such as described in Adv Mater 2013.

The electrical components incorporated into the strain limiting layer can be adapted to function as batteries such as disclosed in J Mater Chem A 1 5505-5508 2013; Adv Mater 22 2065-2067 2010 or Nat Commun 4 1543 201.

The electrical components incorporated into the strain limiting layer can be adapted to function as electroadhesion devices such as described in 1997 Monkman An Analysis of Astrictive Prehension; 2008 Prahald et al Electroadhesive Wall Climbing Robots; IROS13-Shen-ElectrostaticAdhesion; Monkman Industrial Robot An International Journal 30 326-330 2003, the contents of which are incorporated by reference.

Exemplary Electronic Soft Robot Including LED Illumination

In one or more embodiments, electronic soft robots capable of actuation can be prepared by thermal bonding of stacked layers having different functionalities. In one or more embodiments, the electronic soft robots can be manufactured using the high throughput fabrication method described in co-pending U.S. Provisional application Ser. No. 61/978,573 filed Apr. 11, 2014, the contents of which are incorporated by reference. An illuminated soft actuator containing LED lighting on the strain limiting layer was constructed by preparing a set of thermoplastic polyurethane (TPU) backed sheets along with a TPU sheet cut in the shape of a pneumatic network and then stacking and mating these sheets together, as discussed above and shown in FIG. 1A. The thermoplastic properties of the layers allow the layers to be heat bonded. In addition, the ready-made sheets are readily available, inexpensive and easy to use, making the fabrication of the electronic soft robot inexpensive. This process could be done very quickly and potentially in a roll to roll manner, thus allowing manufacture in large quantities.

Electronic circuitry and devices can be incorporated into the strain limiting layer using conventional methods. As shown here, an exemplary electronic circuitry and device include silver electrodes 160 that are electrically connect to LEDs 170. The flexible electrodes were constructed on the inextensible layer by stencil-printing two parallel lines of Ercon silver ink onto Whatman Chr1 Chromatography Paper—though it could be any form of printing (e.g. gravure, screen printing, chemical vapor deposition with shadow masking, microcontact printing, inkjet printing, etc.). After stenciling, the ink was dried in an oven generating the silver electrodes. A section of 3M adhesive-backed LED strip lights, containing 3 LEDs and a resistor 180, was then affixed to the paper. Silver ink was used to connect the stencil-printed electrodes to the positive and negative terminals of the LED strip. Both the paper based flexible electronic and a sheet of spandex then received an elastomeric backing by heat pressing a 0.2 mm sheet of TPU into them at 190° C. for 2 min. A 2 mm thick sheet of TPU was then laser cut to form the pattern for the actuator's pneumatic network. Finally, the TPU backed spandex and flexible electronic were placed on both sides of the laser cut TPU pneumatic network and the stack was again heat pressed for mating. The resulting soft actuator is shown in FIG. 1C.

Electronic Soft Robot Capable of Gripping (a Soft Hand)

In one or more embodiments, electronic soft robots capable of actuation can be prepared by using a molding process. An extensible elastomeric material is cast in a mold to generate a flexible and stretchable pneumatic, hydraulic, or vacuum actuated network. The network is backed on one side with an inextensible or minimally extensible strain limited layer that incorporates electronic components into the strain limiting layer. In some embodiments, the strain limiting layers can accommodate moderate strains (e.g., <35%, or greater than 40% or greater than 50%, or in a range between 0.1-50% and any range bounded by any of the values noted herein).

In one or more embodiments, the electronic component includes a strain sensor that allows monitoring of strain experienced by the soft robot during actuation. For example, an electronic soft robot can include a robot having actuators that mimic the motion of a human hand and the soft robot can be equipped with strain sensors that measure the curvature of the actuators during actuation.

One promising application of soft robotics is the creation of a soft robotic hand for the purpose of creating a soft prosthesis or a hand for a collaborative robot. In FIG. 3, a soft hand is integrated with electronic sensors to create a hand that can sense its interaction with the objects it is gripping. The left figure shows a soft robotic hand, and the right figure shows a soft robotic hand integrated with appropriate sensors (e.g. temperature sensors, pressure sensors etc.) for mimicking the sensing capabilities of a human hand.

Figure 2A:
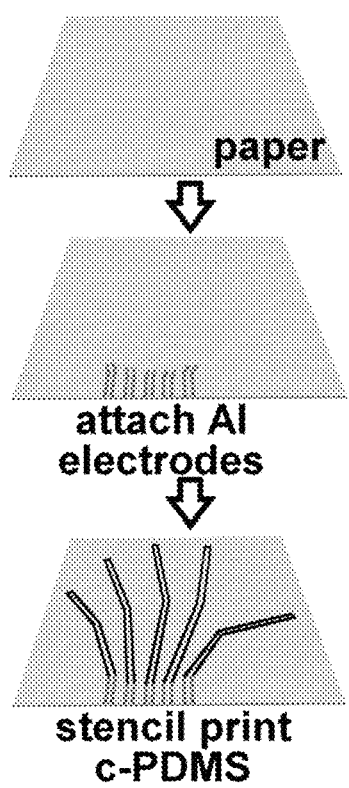
Figure 2B:
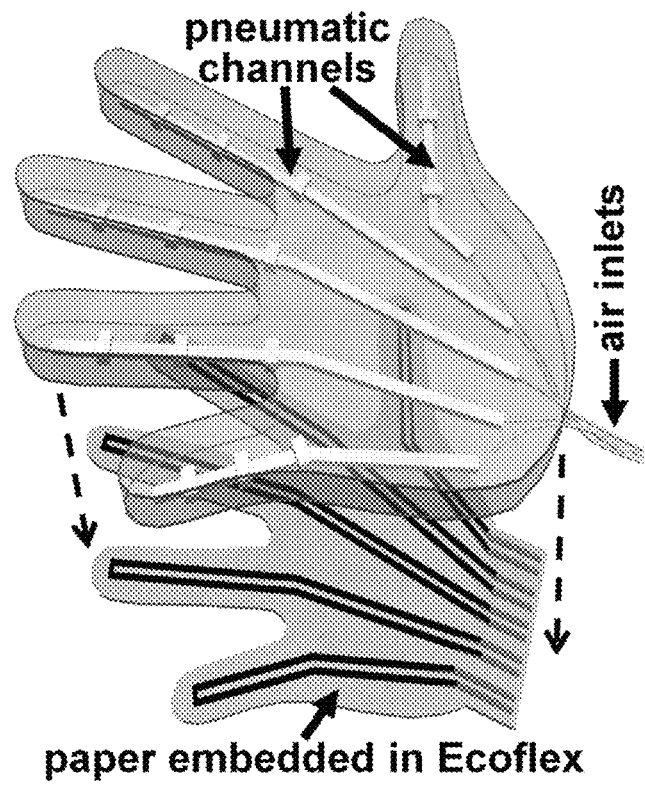

FIGS. 2A and 2B illustrate the procedure used to fabricate the soft, pneumatic hand-gripper with embedded curvature sensors. Soft lithography was used to fabricate the pneumatic actuating layer by casting Ecoflex silicone prepolymer in a plastic mold generated by three-dimensional printing. The strain sensor was a piezo-resistive strain sensor on a sheet of polyester/cellulosic blend paper. The flexible electronic strain-limiting layer containing the piezo-resistive sensors was prepared using by a three-step process as illustrated in FIG. 2A. First, aluminum electrodes were attached to a sheet of paper with adhesive tape. Next, a stencil mask was used to print curvature sensors made of a mixture of carbon black and a polydimethylsiloxane polymer, sylgard 184 (c-PDMS) which were partially overlapping the aluminum electrodes. The c-PDMS lines were cured at 100° C. for 10 min. Finally, the assembly of the hand actuator was completed by placing the Ecoflex polymer actuating layer on top of the paper based flexible electronic strain-limiting layer using Ecoflex prepolymer to bond the two parts. The entire paper received a thin coat of Ecoflex silicone prepolymer in order to transform the paper into an air tight composite. After curing the ensemble at 60° C. for 1 h, the excess paper and polymer were trimmed with scissors.

Figure 3A:
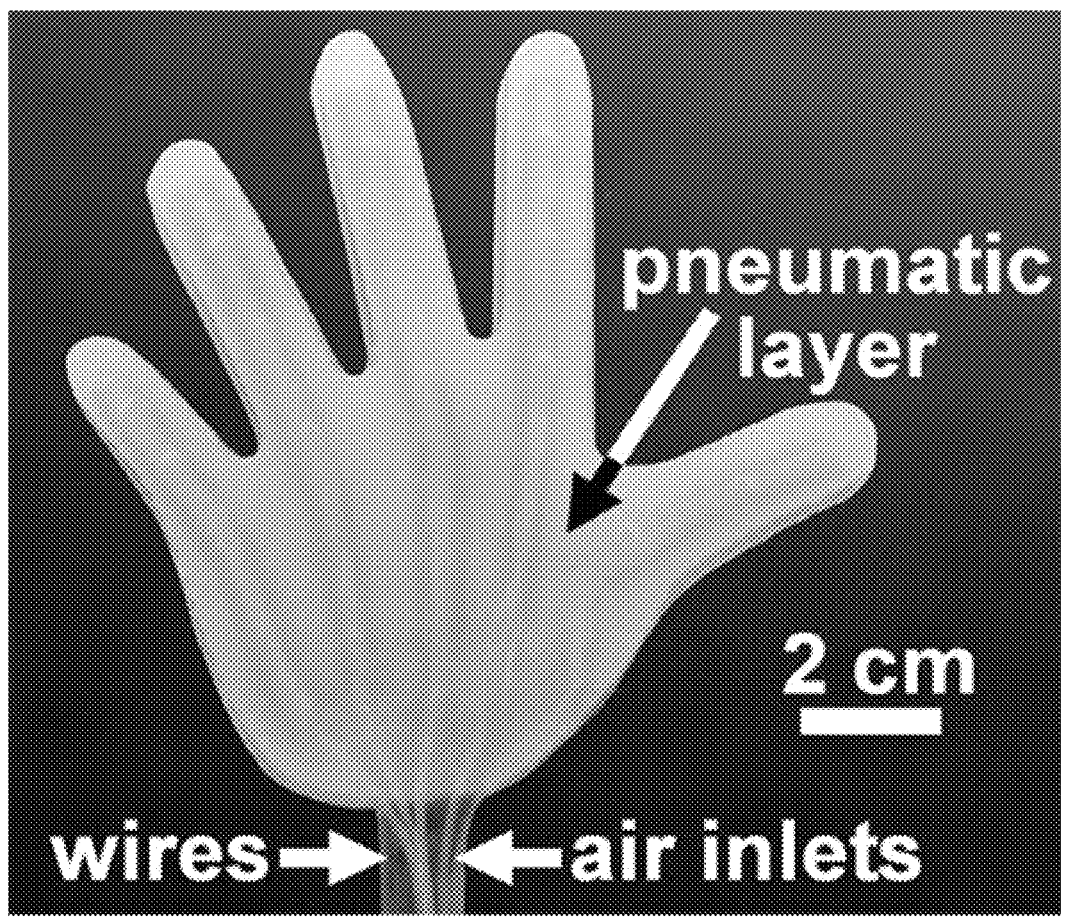
Figure 3B:
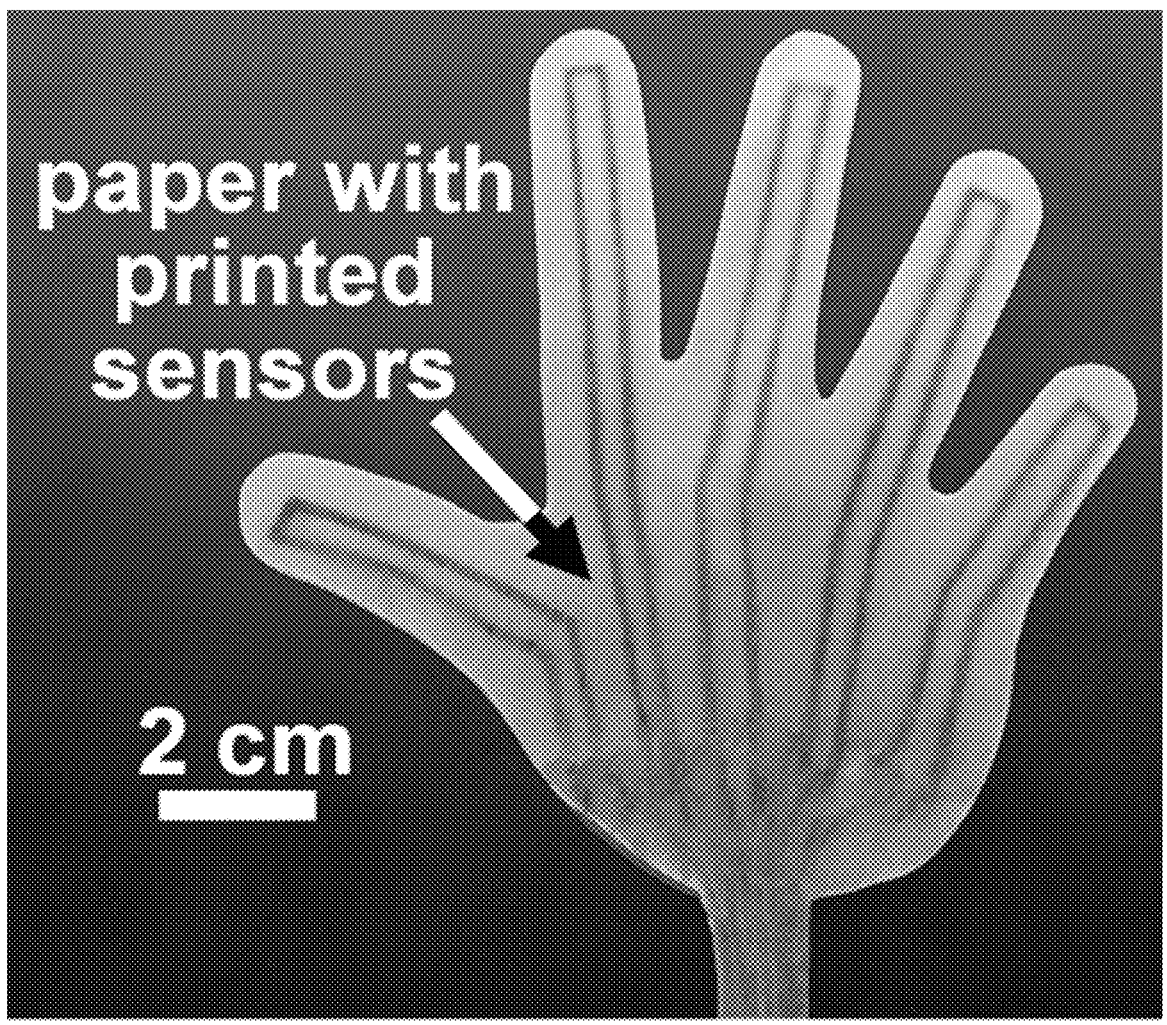
Figure 3C:
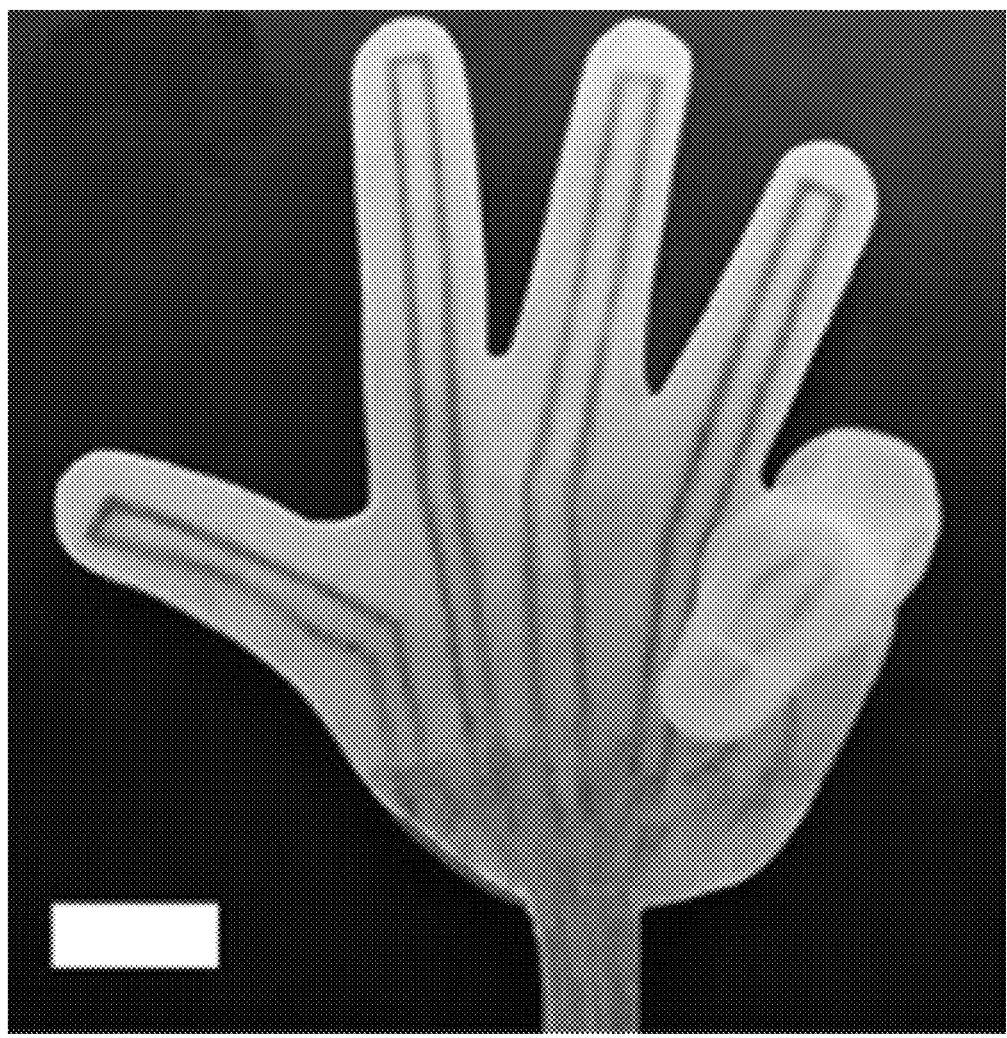
Figure 3D:
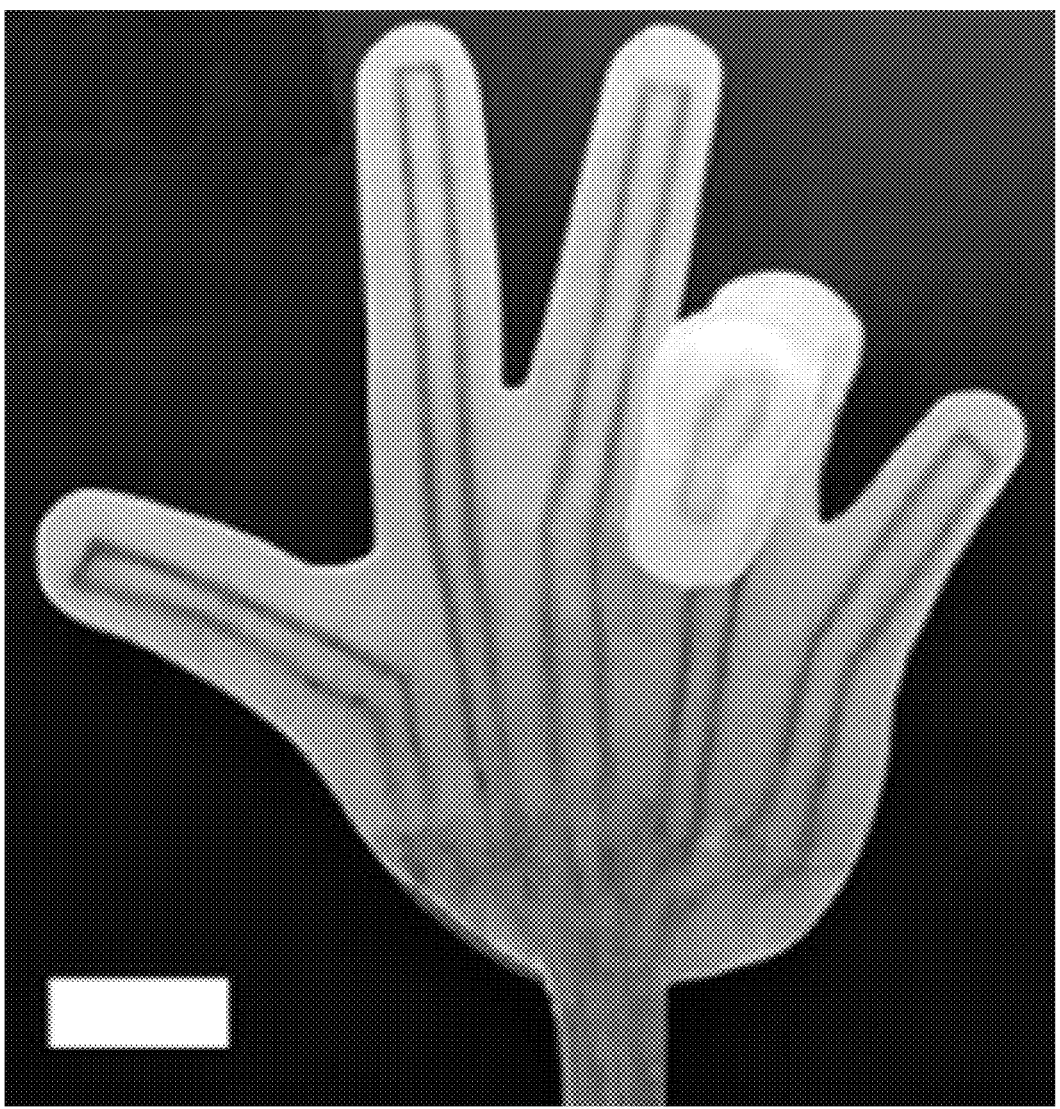
Figure 3E:
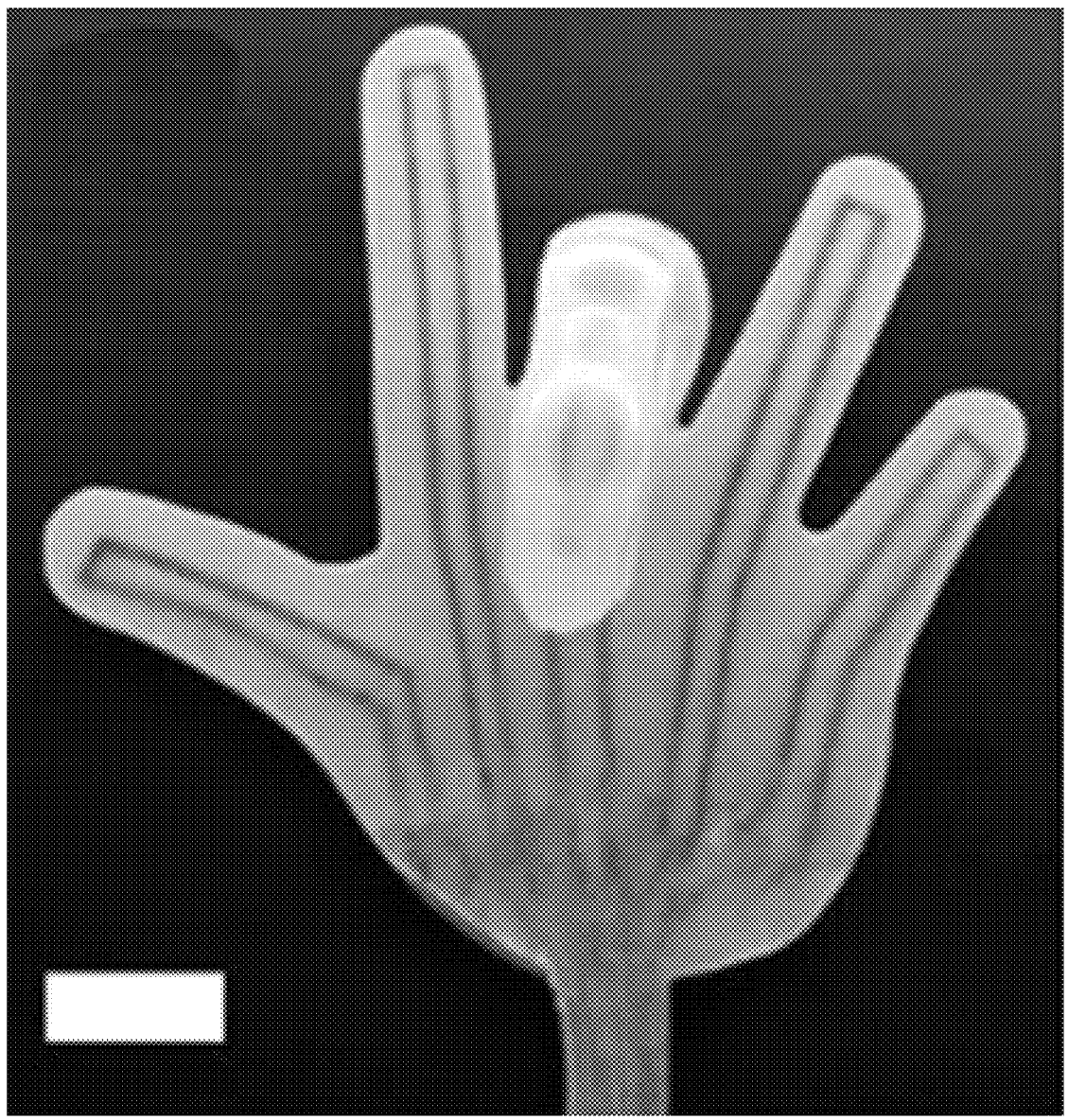
Figure 3F:
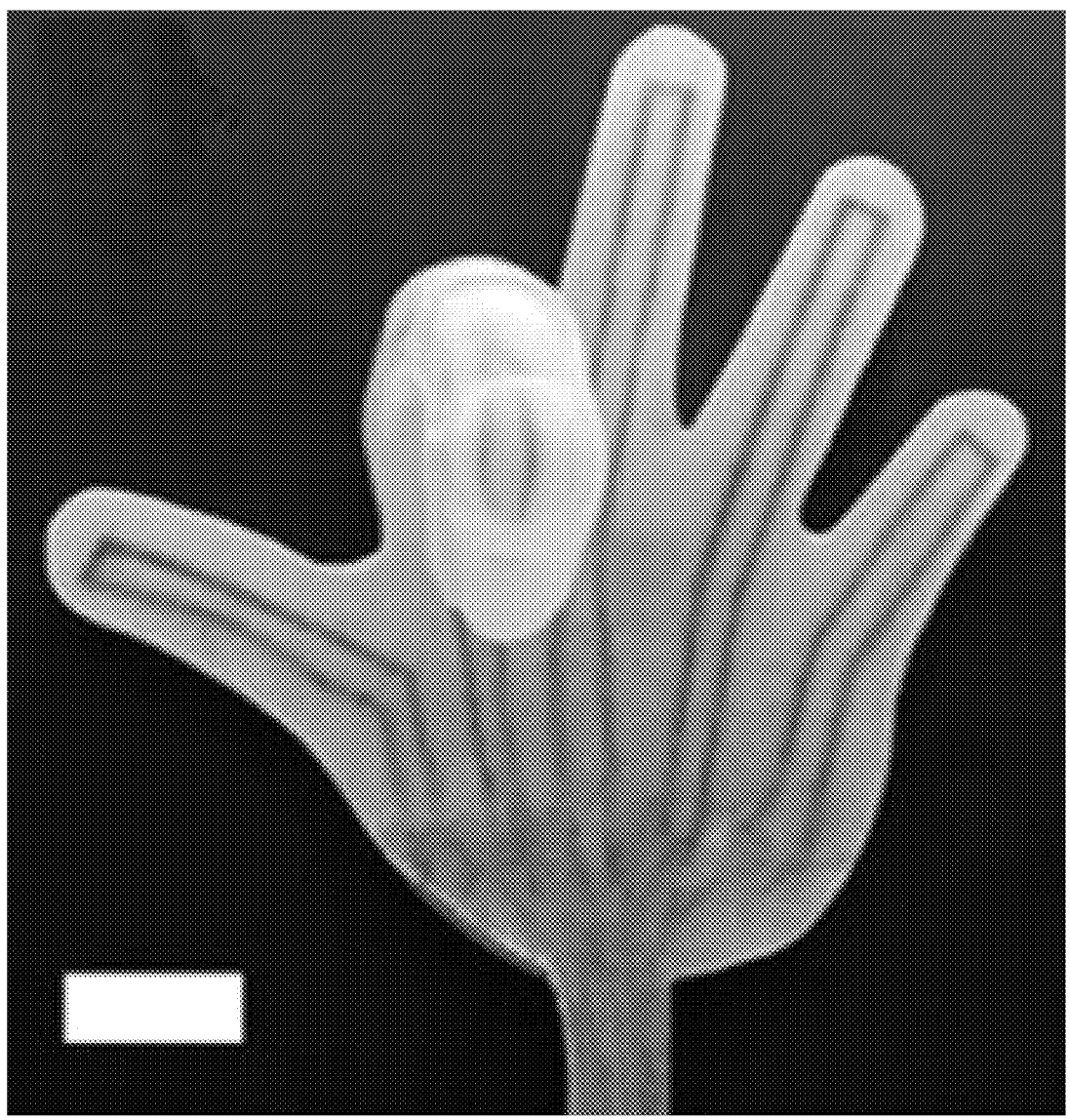
Figure 3G:
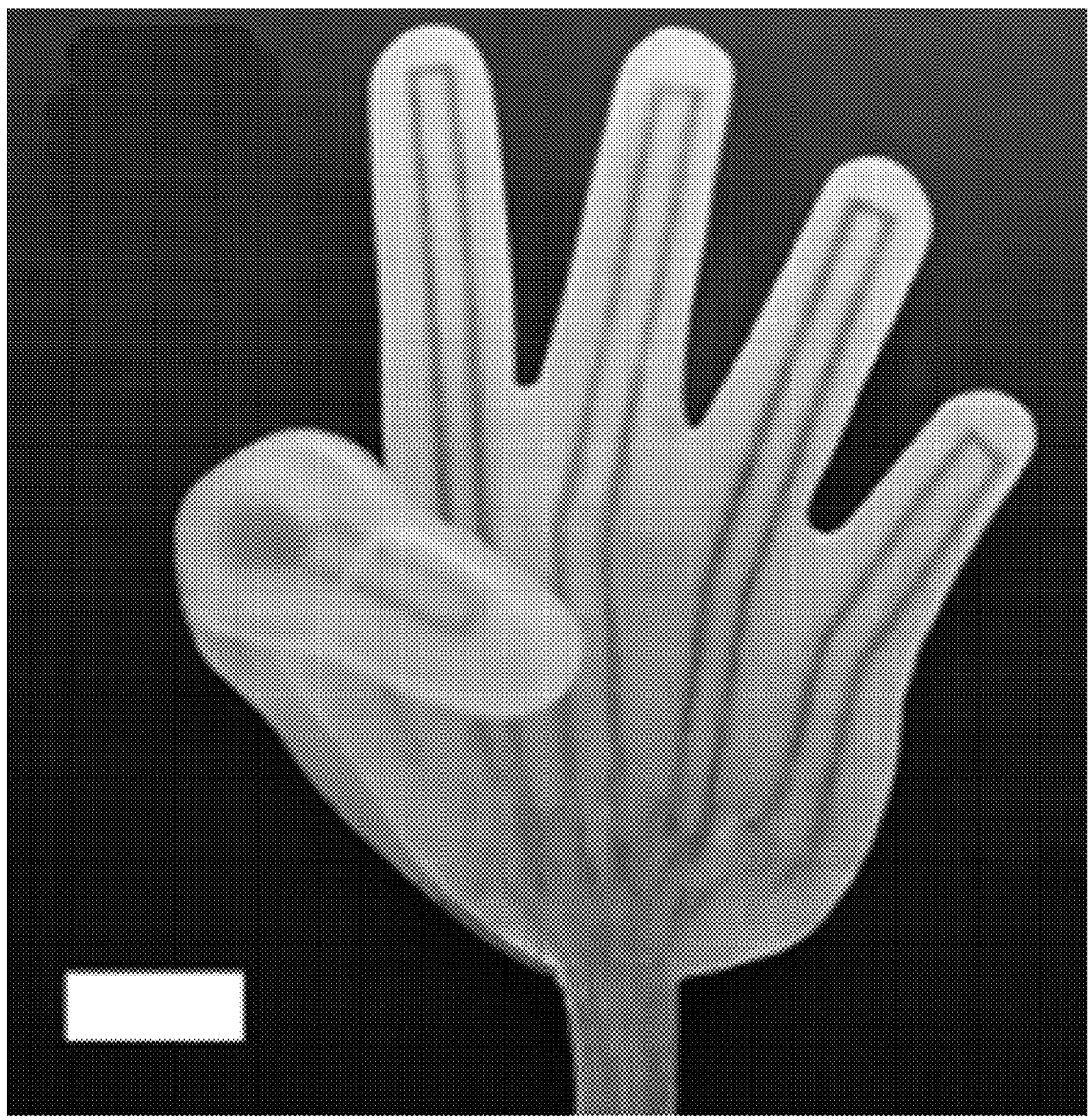
Figure 3H:
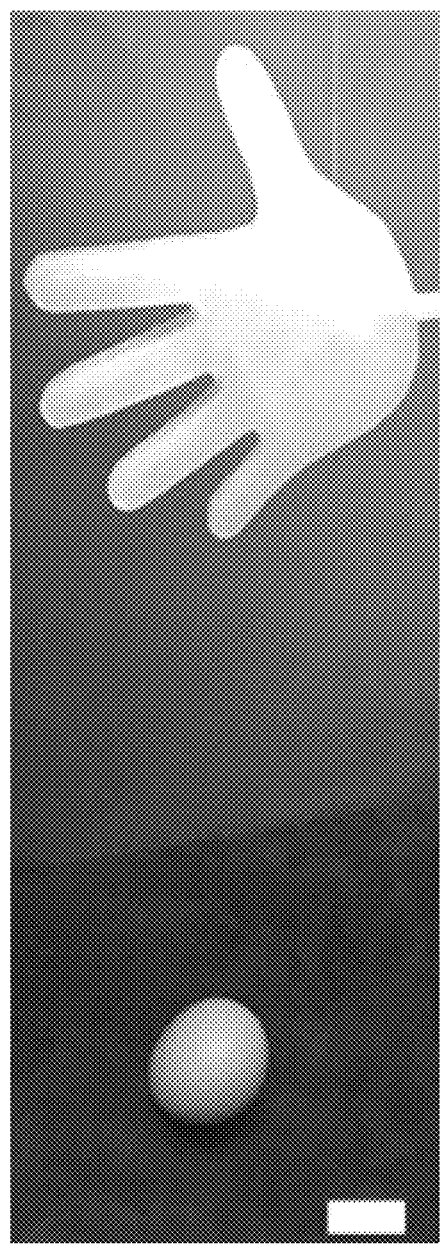
Figure 3I:
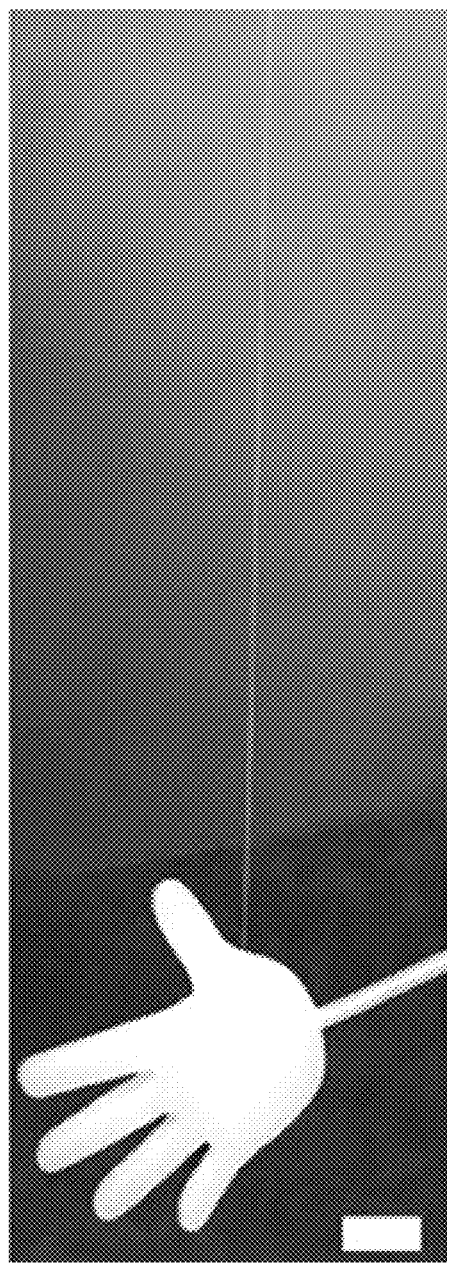
Figure 3J:
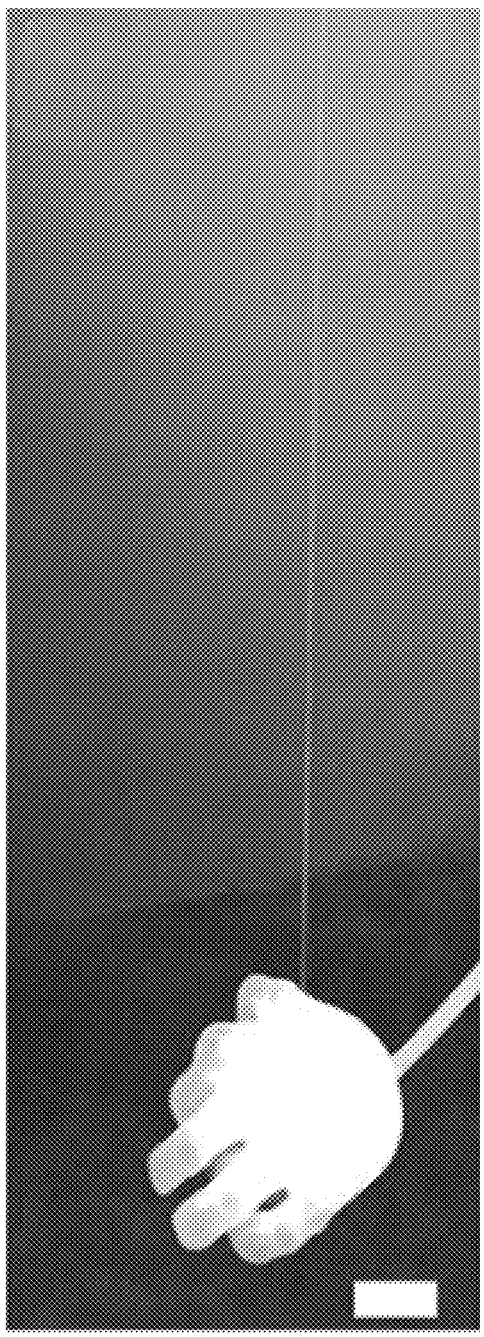
Figure 3K:
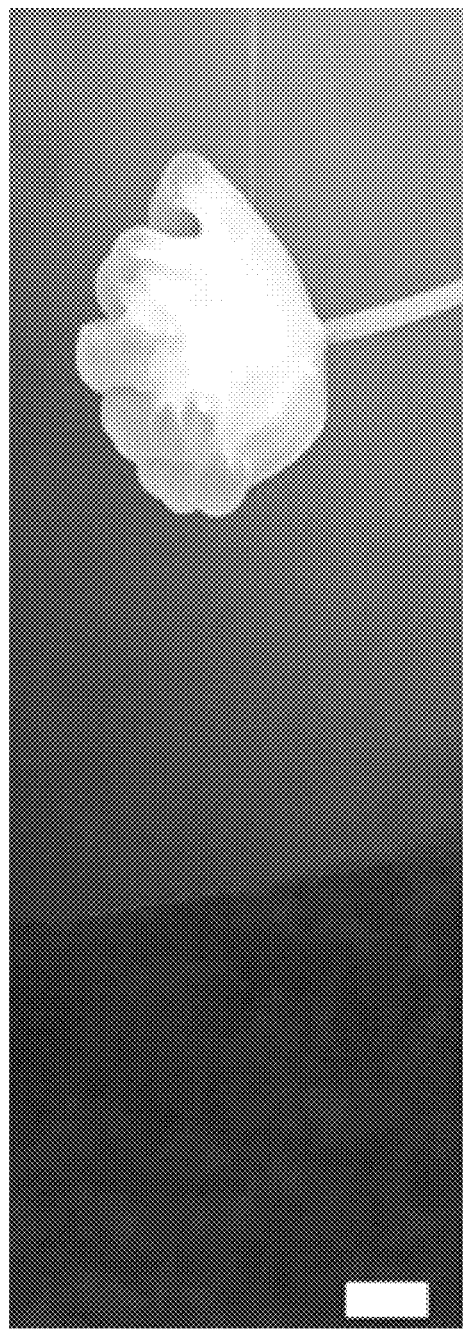
Figure 3L:
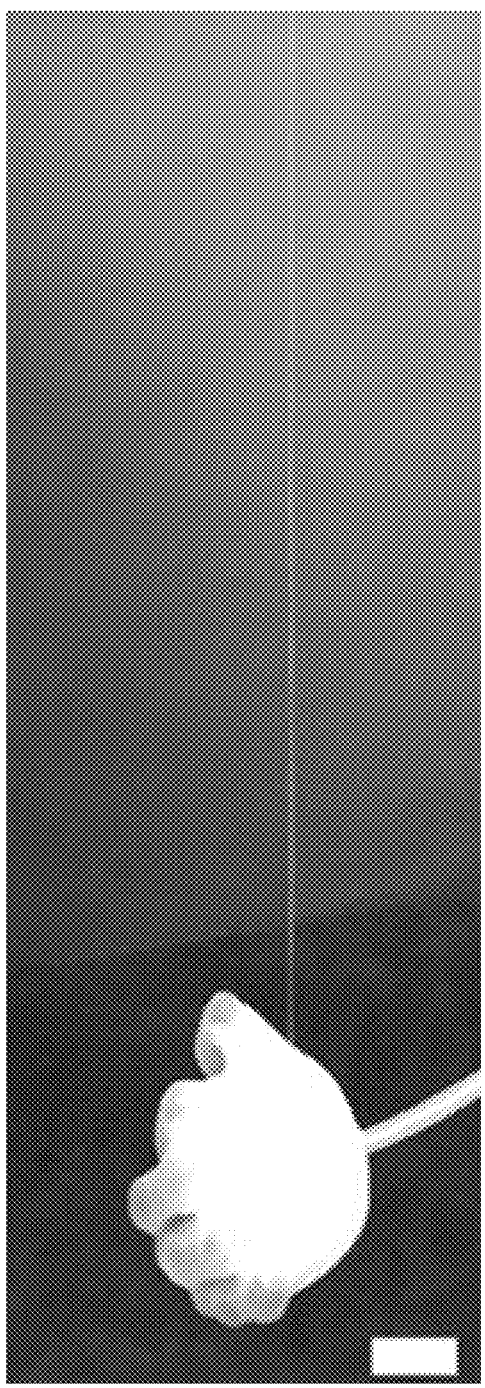
Figure 3M:
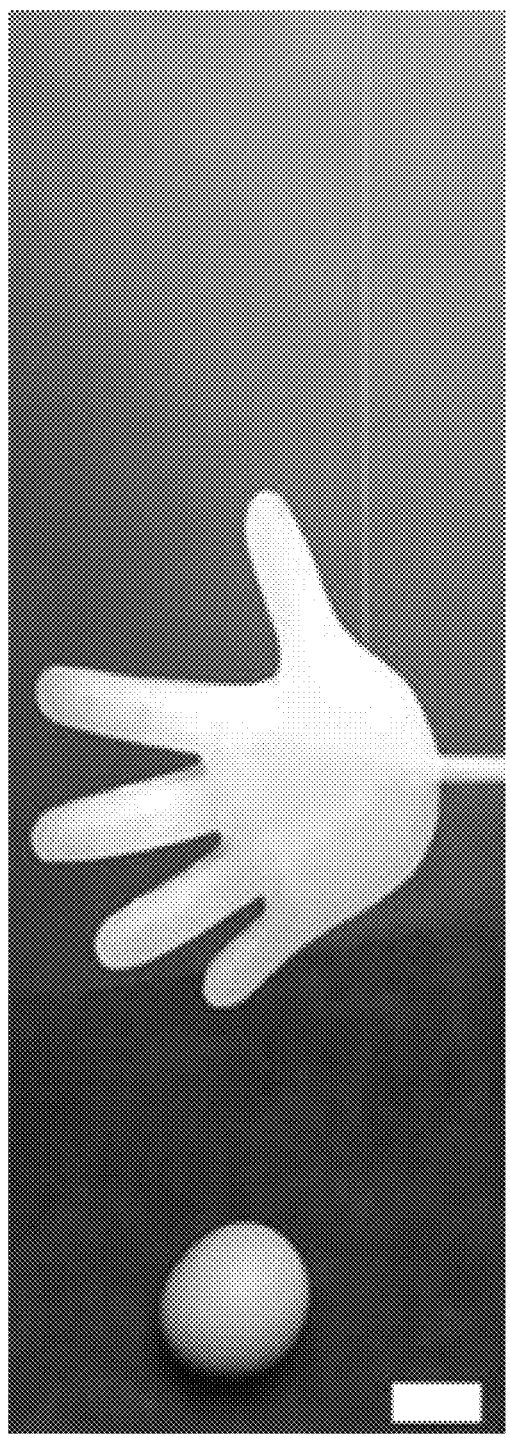
Figure 4A:
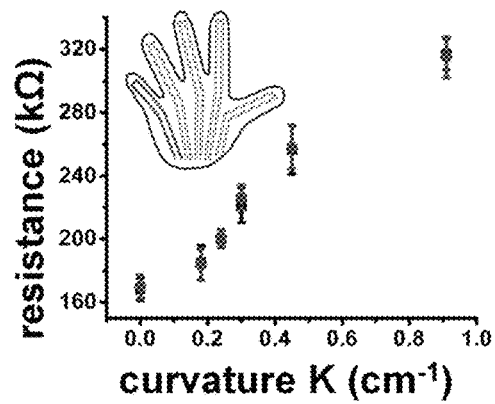
FIGS. 4A-4E depict the dependence of the electrical resistance of the c-PMDS sensors of the hand-like soft robotic gripper with the curvature of their respective fingers before and after hitting the soft actuator ten times with a hammer.
Figure 4B:
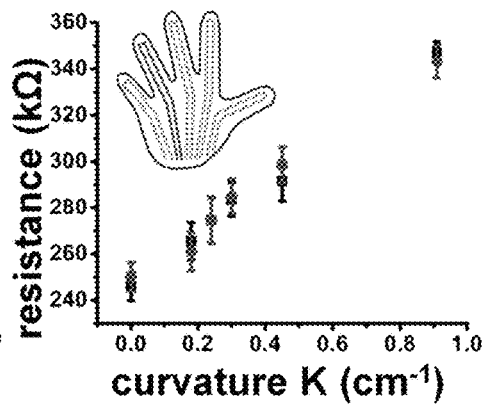
Figure 4C:
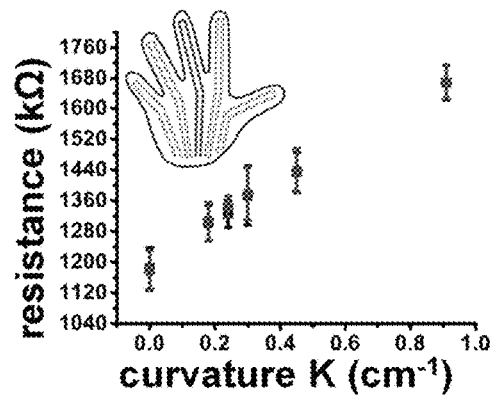
Figure 4D:
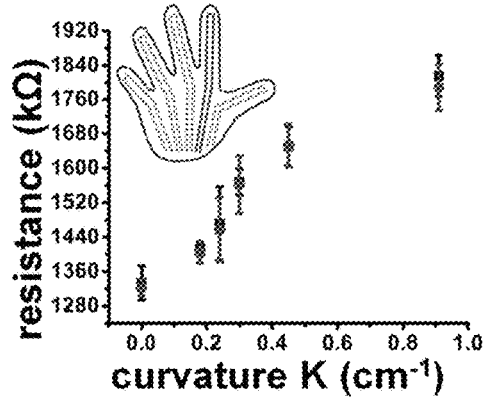
Figure 4E:
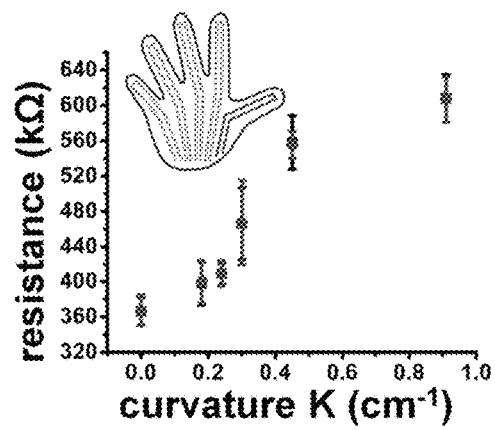

The operation of the hand is shown in FIG. 3A-3M. FIG. 3A is a top-view photograph of the hand-like soft robot showing the pneumatic networks in the extensible elastomeric layer. FIG. 3B is a bottom-view photograph of the hand-like soft robot showing the strain limited layer with printed piezo-resistive sensor. FIGS. 3C-3G demonstrate that each 'finger' of the hand-like actuator can be independently pressurized and actuated. The finger actuators can be operated independently, or in concert, to effect motions typical of the human hand. FIGS. 3H-3M, for example, demonstrate the ability of the hand-like soft robot to pick up a chicken egg.

The piezo-resistive c-PDMS sensors printed on the strain limiting layer of the gripper allow sensing of the curvature of each finger during operation. When a finger of the gripper bends upon pressurization its curvature sensor stretches. This stretching decreases the connectivity of the sensor's percolation network thus increasing its resistance. The paper in the strain limiting layer is near the neutral plain of bending (the neutral plane is the surface within a beam where the material of the beam is not under stress). Since the sensors are printed above the neutral plane of bending on the side of the paper that is facing the less extensible layer they experience extensional force during actuation. If they were printed on the opposite side the sensors would experience compressive force during actuation causing the resistance of the sensor to go down. After releasing the pressure of the pneumatic channels the c-PDMS sensors fully recover their original shape and electric resistance. The resistance of the strain sensors can be monitored and correlated to the amount of curvature experienced by each finger actuator. Each of the finger actuators can be monitored separately. FIGS. 4A-4E are resistance vs. curvature plots (plotted with square data points) for each of the finger actuators of the hand-like soft actuator. This is an example of an electronic component on a strain limited layer that is capable of withstanding moderate strains. Indeed, the moderate strain is used for its sensing capability.

An attribute of the electronic soft robots is that the electronic circuitry can be robust and resistant to malfunction when strained or crushed. This feature is attractive in many applications, where the robot is intended to operate under hazardous conditions or in situations without direct human supervision. FIGS. 4A-4E show the performance of the flexible electronic is unaltered following repeated impacts with a hammer (data plotted with circle data points). As a result, these flexible electronics can survive some of the demanding environments in which soft actuators will be used.

Electronic Soft Robot with Conductive Circuitry in an Inextensible Layer

Commodity materials commonly used for conducting electricity (e.g. wires, conductive meshes, bundled conductive fibers, etc.) can be integrated into soft actuators for making connections to embedded electrical components. Electronic soft robots can include a variety of conventional wires, and other conducting materials such straight wire conductors, wire conductors in a zigzag pattern, wire conductors in a serpentine pattern, wire conductors in a coiled pattern, metal fiber bundles and metal meshes. See, co-pending Provisional application Ser. No. 62/009,084 filed Jun. 6, 2014, for further detail on the use of metal fibers in conductive composites, the contents of which are incorporated herein by reference.

As is shown in FIGS. 5A-5E, conductive wires can be included in the strain limiting layer of a soft robot. FIG. 5A is an illustration of the extensible pneumatic layer 510 of a soft actuator in plan and side view. The chambers 520 and interconnecting channel 530 can be formed, for example, by molding or lithography. FIG. 5B is an illustration in cross-section showing the combination of an extensible pneumatic layer 510 and a less extensible strain limiting layer 540 of a soft bending actuator. FIG. 5C shows attachment of an exemplary electrical component 550 and associated wires 560, 560', 560" for supplying and draining current as well as transmitting signals. The attached electrical component can be a conventional hard electrical component or a flexible and/or stretchable electrical component (e.g., batteries, supercapacitors, myoelectric sensors, neural sensors, electroadhesive pads, displays, photovoltaics, electrochemical detectors, transistors, speakers, microphones, strain sensors, LEDs, thermal sensors, pressure sensors, photodetectors, inertial measurement units, capacitive touch sensors, force sensing resistor, laser range finders, acoustic range finders) Note that in this illustration the electrical component is connected to two conductors but any number of conductors is possible and the number will vary based on system requirements. Where the strain limited layer imposes no strain on the conductive wires, straight wires 560 can be used. Since conventional wires are not stretchable but are bendable they can be fashioned into bent structures 560" (e.g. serpentine, helical and zigzag patterns etc.) in order to be more accommodating of the strain experienced by the less extensible layer of the actuator. In other embodiments, metal fiber bundles and metal meshes 560' can be used as the conductive wires. FIG. 5D shows the addition of uncured elastomer 570 for the purpose of securing the wires and electronics to the strain limited layer. FIG. 5E shows the final soft actuator with embedded electronics. In the current embodiment, this layer is made from an elastomer so it is extensible. Thus, conductive wires bent into a serpentine pattern and conductive nets as shown in FIG. 5C are possible, since these structures can elongate, via bending, as the elastomer based strain limiting layer stretches.

Electronic Soft Robot Having Serpentine Wires Using Thermal Evaporation Deposition Depositing wires in serpentine patterns is one method for accommodating for the mismatch in stiffness between elastomeric materials and rigid conductors, according to one or more embodiments. This approach can be utilized to create electronic structures on strain limiting layers that stretch during device actuation. FIGS. 6A-6D show various aspects of, an electrical device on a soft actuator is wired using gold serpentine patterns. FIG. 6A shows a cross-section illustration of a soft bending actuator including an extensible pneumatic layer and a less extensible, strain-limited layer. FIG. 6B is a schematic illustration showing deposition of wires onto the strain limiting layer. Wires are deposited by first applying a shadow mask to the strain limiting layer of a soft actuator and then thermally evaporating a chromium adhesion layer followed by a gold conducting layer. FIG. 6C shows the resulting serpentine pattern on the strain limiting layer of a soft actuator after the thermal evaporation process. In this example a hard electrical component (e.g. microcontroller, electromagnet, inertial measurement unit, charge-coupled device, etc.) is attached to the soft actuator with the aid of a polyimide strain isolating layer that serves to restrict stretching of the elastomer located under the rigid electrical device. See, e.g., FIG. 6D.

Electronic Soft Robot Having Stacked Electrical Components

Figure 7A:
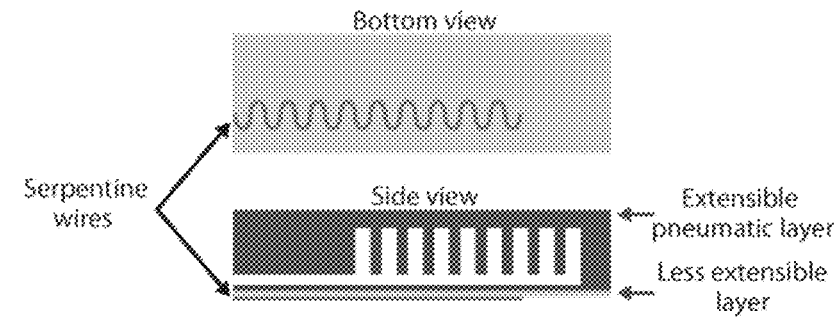
Figure 7B:
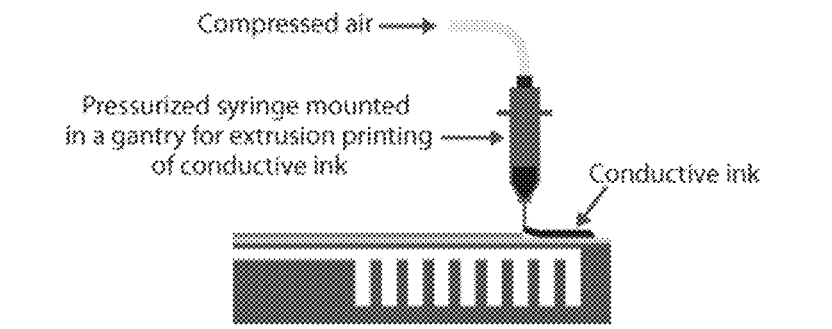
Figure 7C:
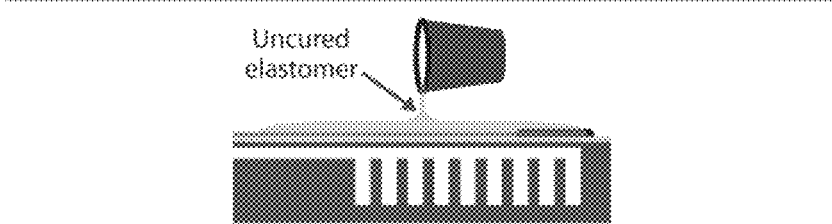
Figure 7D:
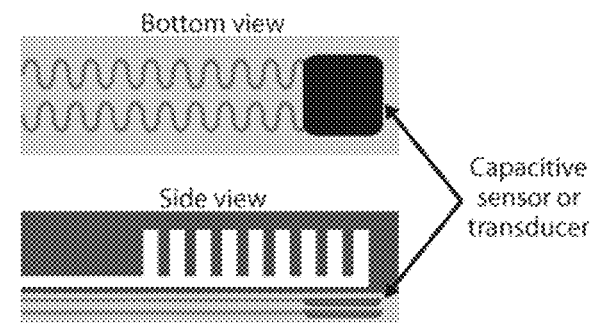

In one or more embodiments, the strain limited layer can accommodate stacked layers of electrical components, which can function as a capacitor. The capacitor can serve as several kinds of electric devices including a touch sensor and a speaker. The multilayer or tiered arrangement of the electronic components further reduces the space requirements for the electronic device(s). A multilayer arrangement of electrical components is illustrated with reference to FIG. 7A-7D. In this example two layers of conductive ink are deposited on a soft actuator to create a structure that could be used as a strain sensor, speaker, microphone, touch sensor, mechanical transducer, capacitor, or pressure sensor. Conductive liquids and gels (e.g. eGaIn, carbon grease, hydrogels, ionic liquids, etc.) can be used to construct soft electronics. FIG. 7A provides a plan view of a lithographically patterned serpentine wire on the less extensible layer of a soft actuator and a cross-sectional view of a soft actuator including an extensible pneumatic layer and a less extensible, strain-limited layer. The serpentine wire is shown on the outward-facing surface of the strain-limited layer. FIG. 7B shows extrusion printing of a conductive ink for creation of a conductive element that can function, for example, as a transducer or capacitive sensor. The conductive ink can be applied to the strain limiting layer from a pressurized syringe mounted above the soft actuator. FIG. 7C illustrates the next step in the manufacturing process in which the wire and extruded ink are coated with a curable elastomer. This step serves to encapsulate the extruded pattern in order to affix it to the actuator, secure its electrical connection to the wire, and provide a dielectric material that will separate the two layers of conductive ink in the final soft electronic. Lastly, a second layer of conductive components can be added to the strain-limited layer, in the manner as previously described. FIG. 7D is a side view illustration of the finished device after addition of a second wire, layer of conductive ink and layer of elastomer.

Exemplary conductive liquids and gels are disclosed in Adv Mater 23 3559-3564 2011; Adv Mater 2013; Adv Funct Mater 2012; Adv Mater 2014; IEEE IROS 2011 and Science 341 984-987 2013, which are incorporated herein by reference.

Electronic Soft Robot Having Embedded Strain Gauge

Another method for depositing liquids for constructing soft electronics is omnidirectional printing. FIGS. 8A-8C illustrate how omnidirectional printing is used to create a strain gauge on a strain limiting layer of a soft actuator. FIG. 8A is an illustration of the extensible layer of a soft actuator. The extensible layer includes a thin opposing layer of extensible material spaced apart from the spaces defining the pneumatic chambers. In FIG. 8B, a layer of uncured elastomer is deposited over the thin opposing layer of extensible material of the extensible layer and a conductive ink pattern is extrusion printed inside of the layer of uncured elastomer. If the ink has the same density as the uncured elastomer it will be neutrally buoyant in the elastomer. As a result when you extrude the ink into the uncured elastomer it will neither sink nor float and as a result you can print intricate 3D patterns of ink in the elastomer. The uncured elastomer is then cured to secure the conductive trace in the strain limited layer. When the elastomer cures what results is a 3D ink structure that is trapped in the rubbery block of elastomer. FIG. 8C is a cross-sectional view and bottom plan view of the device after curing of the elastomer. The device includes a less extensible layer made up of thin opposing layer of extensible material spaced apart from the spaces defining the pneumatic chambers, the conductive traces deposited using omnidirectional printing and an overcoating of cured elastomer. Wires are inserted into the ends of an embedded channel of conductive ink to generate the finished soft actuator with embedded strain gauge. Omnidirectional printing is described in Adv Mater 2014, which is incorporated herein by reference.

Electronic Soft Robot Exhibiting Electroadhesion

Figure 9A:
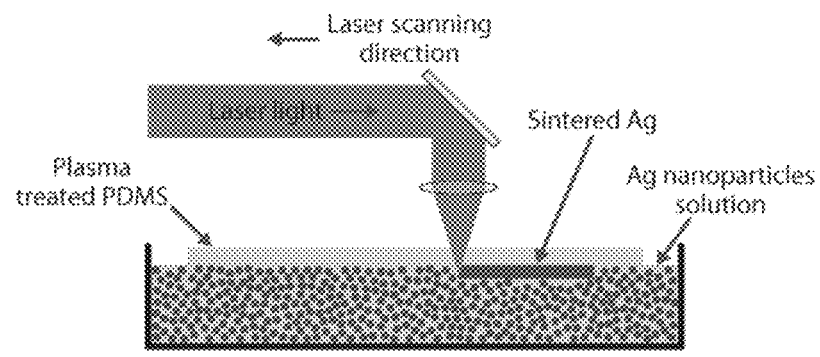
Figure 9B:
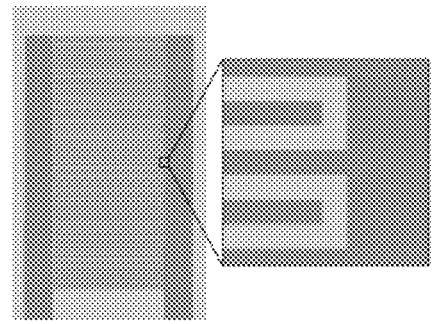
Figure 9C:
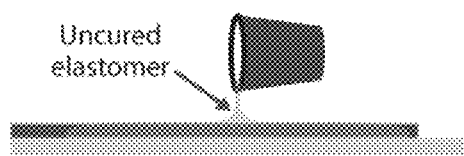
Figure 9D:
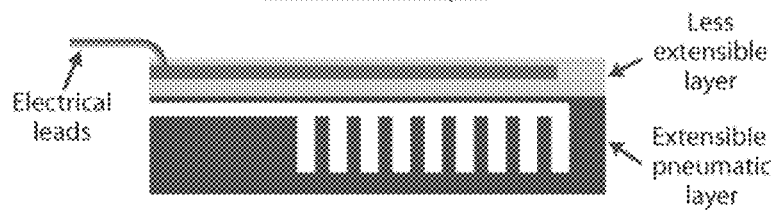

Electroadhesion is an electrically controlled, astrictive, adhesion technology used in applications such as gripping that often require reversible, adhesive-free, binding to a substrate. A typical electroadhesion pad consists of two interdigitated electrodes patterned on the surface of a dielectric material. FIGS. 9A-9D illustrate the fabrication of a soft actuator with an embedded electroadhesive pad using a laser direct write fabrication process. FIG. 9A shows a plasma treated elastomer sheet partially submerged in a silver nanoparticle solution. Next laser light is brought to a focus at the interface between the elastomer sheet and the solution in order to sinter the silver nanoparticles at the interface and secure them to the elastomer sheet. The laser focus is scanned across the interface in order to create the desired electrode pattern. FIG. 9B is a top view of the patterned elastomeric sheet. The exploded view shows the interdigitated fingers of the conductive electrodes. In FIG. 9C, a thin layer of elastomer is added to the surface of the electrodes in order to create a dielectric layer, which is required for the proper function of the electroadhesive pad. In FIG. 9D, finally the elastomer sheet is attached to the extensible layer of a soft actuator and wires are attached to the two electrodes for the purpose of charging the device. Metal pattering on PDMS via laser sintering is described in J Micromech Microeng 21, 095018 (2011), which is incorporated herein by reference.

Figure 10A:
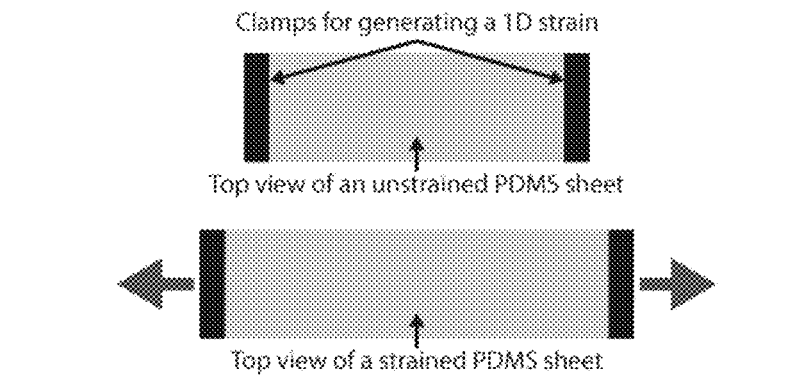
FIGS. 10A-10F illustrate an exemplary electronic soft robot having a buckled surface in the less extensible layer according to one or more embodiments.
Figure 10B:
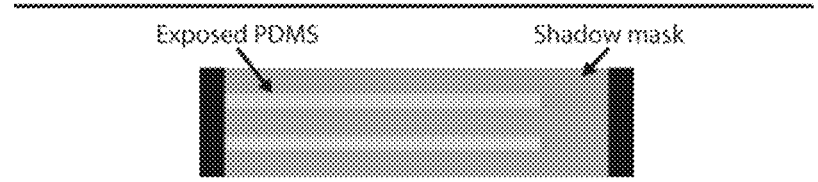
Figure 10C:
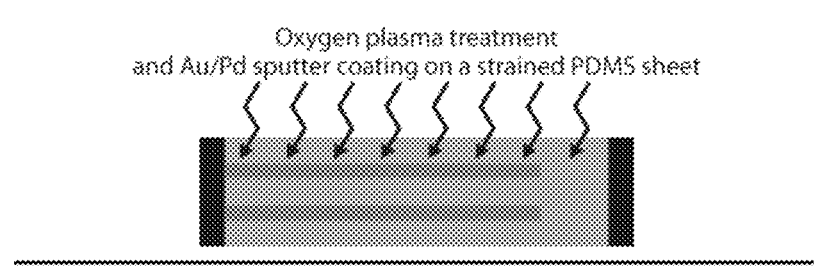
Figure 10D:
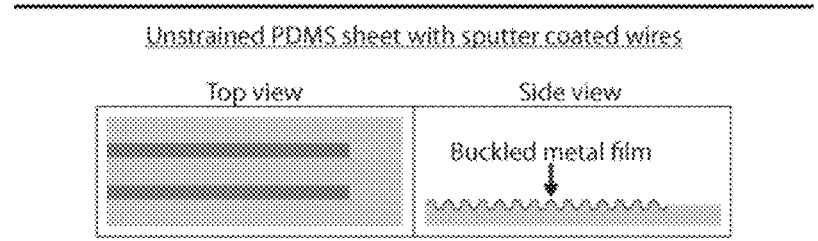
Figure 10E:
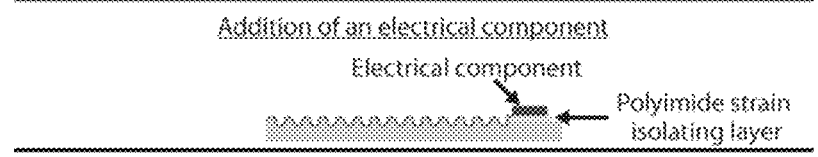
Figure 10F:
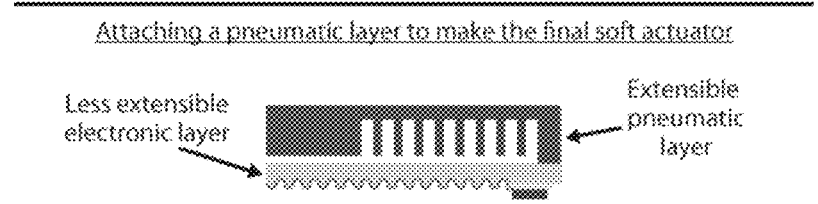

Electronic Soft Robot Having Electronic Components on a Moderately Extensible Layer The creation of buckled metal films is another method for accommodating for the mismatch in stiffness between elastomeric materials and rigid conductors. The creation of a buckled film is typically accomplished by depositing a film on an elastomeric substrate that is mechanically stretched (though deposition on thermally expanded films is also contemplated). After film attachment, the elongational stress placed on the elastomeric substrate is removed allowing the substrate to contract and buckling the deposited film. FIGS. 10A-10F illustrate fabrication of buckled wires by lithographically patterning material on a uniaxially strained PDMS elastomeric sheet. FIG. 10A shows one method of generating a mechanically strained elastomer sheet, for example, by clamping the edges and elongating the sheet. The strained sheet can be masked, for example using a shadow mask, in order to define the pattern of the applied film, as shown in FIG. 10B. The exposed regions of the PDMS sheet can then be coated with metal. FIG. 10C shows that the elastomer is first plasma-treated, and then gold and palladium are sputter-coated on to the sample. The mechanically applied strain is then released allowing for the elastomeric sheet to contract, buckling the conductive coating, as illustrated in top view and side view in FIG. 10D. An additional electrical component is then attached to the unstrained PDMS layer. FIG. 10E illustrates a hard electrical component attached to the soft actuator with the aid of a polyimide strain isolating layer. Finally, in FIG. 10F, the strain limiting layer is attached to a more extensible pneumatic layer to form the final soft electronic actuator.

Additional detail in the manufacture of buckled films is found in Soft Matter 7 7177 2011; PNAS 104 15607 2007; J Vac Sci Technol A 22 1723-1725 2004; PNAS 105 18675-18680 2008; Proceedings of the IEEE 93 8 1459-

1467 2005 and Science 311 208-212 2012, which are incorporated herein by reference.

Electronic Soft Robot Having a Photosensor in the Less Extensible Layer

Figure 11A:
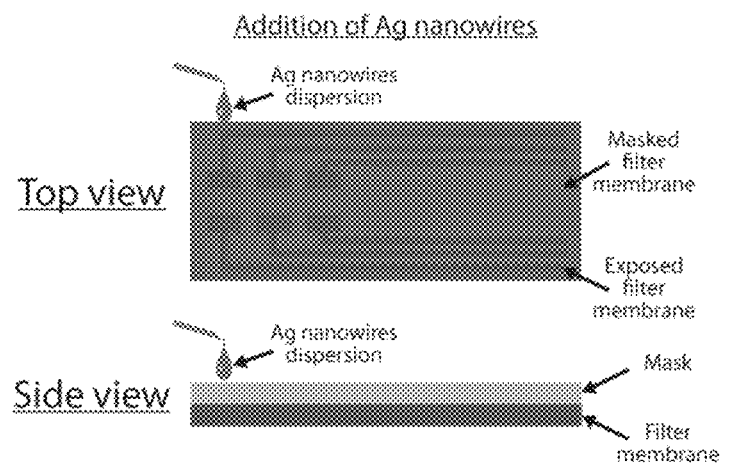
FIGS. 11A-11D illustrate an exemplary electronic soft robot incorporating photosensors in the less extensible layer according to one or more embodiments
Figure 11B:
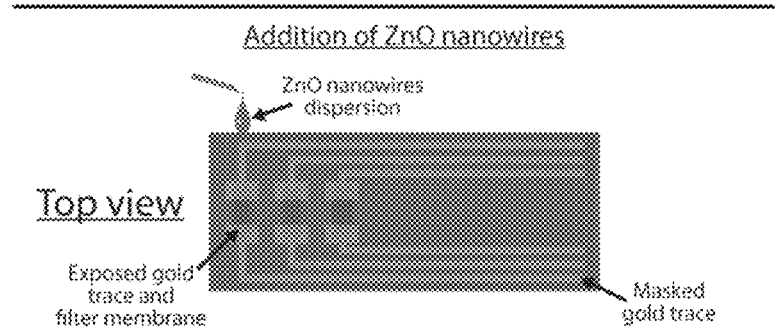
Figure 11C:
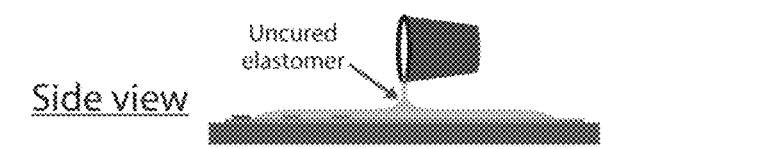
Figure 11D:
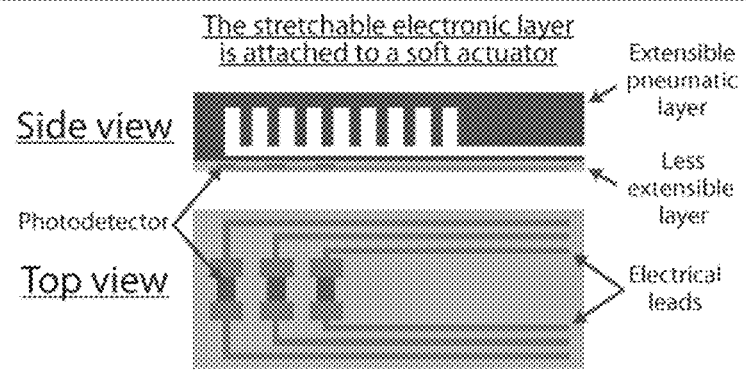
Figure 13:
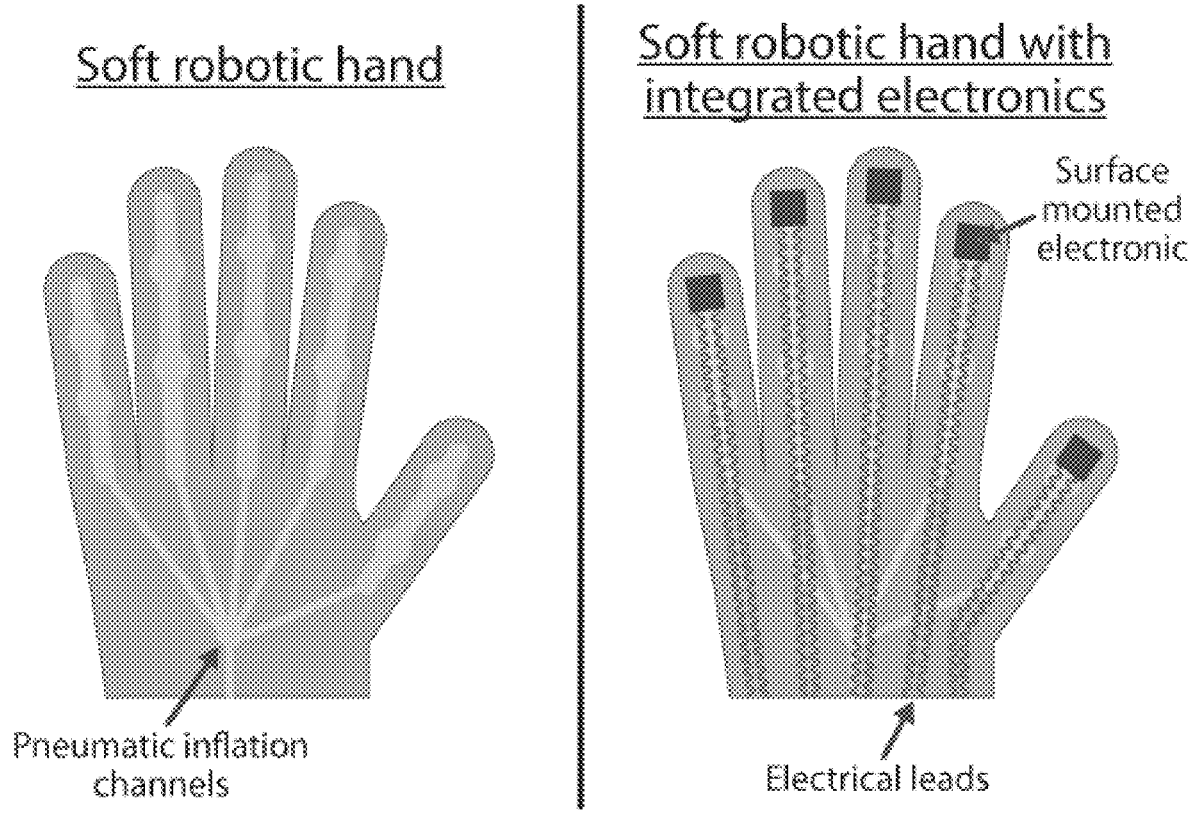
FIG. 13 illustrates an exemplary electronic soft robotic hand incorporating electrical leads and surface mounted electronics according to one or more embodiments.

Stretchable electronics can be fabricated by depositing materials (e.g. conductors, semiconductors, insulators, etc.) on a temporary support structure followed by encapsulation of that material in elastomer. In this example a soft actuator with embedded photovoltaic sensors is created using this method. Referring to FIG. 11A, an elastomeric mask is applied to the surface of a polycarbonate filter membrane in order to define the pattern of the first material to be deposited. Next a dispersion of gold nanowires is poured over the mask and allowed to be filtered by the membrane. This process removes the liquid phase of the dispersion leaving behind the gold nanowires. Next the gold nanowire film is thoroughly rinsed with ethanol. FIG. 11B shows the application of ZnO nanowires using a second mask. The second mask is aligned on top of the gold pattern followed by application of a zinc oxide nanowire dispersion and subsequent rinsing with ethanol. In FIG. 11C, uncured elastomer is poured onto the filter membrane in order to encapsulate the pattern of gold and zinc oxide nanowires in elastomer. The elastomer is then cured and the resulting elastomeric sheet is peeled off of the filter membrane. Finally, in FIG. 11D, the elastomeric sheet with patterned nanowires is shown in side and top view, which form a plurality of photo sensors. The sheet is attached to the extensible layer of a soft actuator to form the final soft electronic actuator.

Additional detail in making stretchable photovoltaics and in particle encapsulation printing is found in Adv Mater 23 3500-3505 2011 and J Mater Chem C 2 1298-1305 2014 and Adv Mater 2013, which are incorporated herein by reference.

Electronic Soft Robot Incorporating a Soft Energy Storage Device

Soft, flexible, and/or stretchable batteries and super capacitors have been previously described and can be incorporated into the less extensible layer of a soft robot. These energy storage devices can be embedded in the strain limiting layer of a soft actuator for powering devices associated with the soft machine (pumps, sensors, solenoid valves, nitinol actuators, etc.). FIGS. 12A-12B show how a soft alkaline battery is integrated into a soft actuator. In FIG. 12A, a collection of four soft batteries is used, though it could be any number of batteries, are connected in parallel on the strain limiting layer of a soft actuator. The batteries could first be constructed individually, then wired together and mounted on the extensible layer of a soft actuator. Next the batteries and electrical connections are encapsulated in a stiff elastomer to form an electric strain limiting layer. FIG. 12B illustrates the construction of an exemplary soft battery consisting of an $MgO_2$ cathode and Zinc anode with a potassium hydroxide salt bridge.

Applications for Electronic Components Incorporated into a Strain-Limiting Layer Pressure and temperature sensors can be used for soft grippers or soft prosthetic limbs. For example, off the shelf pressure and temperature sensors can be incorporated into a hand-like soft robot or other soft robot in a manner similar to that described for incorporating an LED strip onto a soft actuator. The pressure sensors could provide information on grip strength of the device, while the temperatures sensors would provide information regarding the temperature of contact surfaces.

Soft strain sensors can be used as part of a closed loop control system for controlling the motion of soft actuators. For example, in the hand-like soft robot, as the sensor resistance changes, it provides information on the location of the finger actuators. In one embodiment, a control loop system controls the pressurization of the actuator to a preselected resistance measurement, which is correlated to a finger location.

In one or more embodiments, the strain sensor is configured to provide a resistance measurement and resistance is correlated to a curvature, position or location of the strain limited layer.

In one or more embodiments, the strain sensor is configured to provide a capacitance measurement and capacitance is correlated to a curvature, position or location of the strain liming layer.

In any of the preceding embodiments, the pressure sensor is configured to provide a pressure measurement and pressure measurement is correlated to a grip strength of the soft robot.

In any of the preceding embodiments, the temperature sensor is a thermocouple configured to provide a voltage measurement and voltage is correlated to a temperature of the strain limited layer; in other embodiments, the temperature sensor is a resistance temperature detector, thermistor, or zener diode, for example, resistance or voltage is measured for temperature determination The electrical component can provide the componentry (e.g. wires and valves) for a distributed fluidic pressurization/depressurization system where valves are integrated with each chamber in a pneumatic, hydraulic, or vacuum actuator system so that a large number of actuators, at disparate points of a soft robot, can be supplied by a common set of gas, liquid, or vacuum lines respectively. This would eliminate the need for the present design where a large bundle of individual gas, liquid, or vacuum lines are run from a central source to address individual actuators.

The electrical component can provide illumination provided by soft actuators for low visibility scenarios in collaborative robotics, autonomous robotics, remote rescue robots, or medical devices. In one embodiment, the medical device can be a surgical retractor. For example, a self-retaining tissue retractor can be equipped with LEDs embedded in the strain limiting layer. This feature can help improve visibility in difficult to illuminate areas.

The electrical component can include embedded chemical or biological sensors in the soft actuators. The chemical or biological sensors could be incorporated into soft surgical tools for medical diagnostics. Biological and chemical sensors can be designed to detect a variety of analytes, such as ferricyanide, heavy-metal ions, lactate, uric acid, potassium and sodium, for example. For example, Ag/AgCl and carbon electrodes can be stencil-printed onto the strain limiting layer and the circuitry can be arranged to function as a cyclovoltameter. In other examples, the electrical circuitry can be selected to function as a glucose detector. Current glucometers use test strips containing glucose oxidase, an enzyme that reacts to glucose in the blood droplet, and an interface to an electrode inside the meter. A soft robot can include a connection to a meter external to the robot, or it can include a meter on the strain limiting layer. In other embodiments, a set of electrodes for an immunoassay and circuitry can be stencil printed onto the strain limiting layer.

The electrical component can incorporate video or text displays into soft robots that interact with people. In particular, creating soft robots with digitally generated faces. In one or more embodiments, the strain limiting layer can include a flexible LCD, LED, electrowetting, plasma or electronic paper display or other flexible electronic layer; the electronic layer could be used to display images or other readouts.

The electrical component can include acoustic or pressure transmitters and sensors for performing medical physical examinations (e.g. breast, prostate, abdomen, testicular, female pelvic and for the detection of lymphadenopathy, etc.). The electronic soft robot can be, for example, a hand-like soft robot equipped with piezoelectric elements on the strain limiting layer. The soft gripper can establish contact with a test material, e.g., prostate for conducting a prostate exam, and the electronic transmitters and sensors provides examination data.

The electrical component can include speakers and microphones for audio interaction with humans as part of either an autonomous robot or remote telepresence. Equipping a soft robotic with soft electronic speakers and microphones enables the robot to 'speak' or interact with subjects.

The electrical component can conductivity and impedance sensors for object identification or for assessment of living tissues using soft graspers. Resistance, impedance, and capacitance can be measured. For example, the electronic soft robot can be a hand-like soft robot equipped with conductivity or impedance sensors on the strain limiting layer. The soft gripper can establish contact with a test material, and the electronic sensor provides examination data.

The electrical component can include photo-detector arrays for performing spectroscopy (IR, visible, UV, X-ray, etc.). Photodiodes can be incorporated into the strain limiting layer as was done with LEDs herein above. The photodiodes could be used as part of a spectrometer.

The electrical component can include flexible or rigid CCD chips for image collection in the fields of medical devices, medical diagnostics, collaborative robotics and robotic automation.

The electrical component can include wires for transmitting power to soft electronic muscle actuators. The strain limiting layer can be used to establish circuitry capable of delivering power/energy to other areas of the soft robot. For example, circuitry can be included in the strain limiting layer that directs electrical energy from a battery source (external or on-board) to an actuation system.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A soft robot having an integrated electrical component, comprising:
    an expandable or collapsible body, the body comprising an inlet that is configured to communicate with a fluid source; and
    a flexible strain limited layer secured to a portion of the expandable or collapsible body, wherein the strain limited layer comprises two or more layers and two or more electrical components comprising one or more sensors located in the two or more layers.

2. The soft robot of claim 1, wherein the strain limited layer is inextensible.

3. The soft robot of claim 1, wherein the strain limited layer can accommodate strain in the range of 0.1-50% strain in extension.

4. The soft robot of claim 1, wherein the electrical component comprises a device capable of measurement of a voltage, current, or an impedance.

5. The soft robot of claim 1, wherein the electrical component comprises a device capable of amplification, attenuation, filtering, or switching of electronic signals.

6. The soft robot of claim 1, wherein the electrical component comprises a device capable of mechanical or electrical work in response to a change in supplied voltage and/or current.

7. The soft robot of claim 1, wherein the electrical component comprises a device that emits radiation in response to a change in supplied voltage and/or current.

8. The soft robot of claim 1, wherein the electrical component comprises a device that changes temperature in response to a change in supplied voltage and/or current.

9. The soft robot of claim 1, wherein the electrical components in different layers are interconnected using electrical vias.

10. The soft robot of claim 1, wherein the electrical components are configured to function as a capacitor.

11. The soft robot of claim 1, wherein the expandable or collapsible body comprises a plurality of expandable or collapsible fluidly interconnected chambers, and the inlet is configured to communicate with all or a subset of the plurality of expandable interconnected chambers.

12. The soft robot of claim 1, wherein the expandable or collapsible body comprises one or more elastomeric chambers configured to inflate upon fluidic pressurization or collapse upon depressurization.

13. The soft robot of claim 1, wherein the expandable or collapsible body comprises one or more flexible or extensible chambers configured to open or unfold upon fluidic pressurization or close or fold upon application upon depressurization.

14. The soft robot of claim 1, wherein the expandable body is a molded body.

15. The soft robot of claim 1, wherein the expandable body comprises a laminate body.

16. The soft robot of claim 1, wherein the electrical component comprises at least one or more of conductive lines, electrodes, transistors, photovoltaics, electrochemical detectors, batteries, supercapacitors, electroadhesive pads, displays, electromechanical transducers, speakers, microphones, photo detectors laser range finders, acoustic range finders antennas, oscillators, inductors, inductive heaters, capacitors, supercapacitors, electromagnets, resistors, resistive heaters, relays, photovoltaics, rectifiers, diodes, zener diodes, LEDs, OLEDs, CCDs, pneumatic or hydraulic pumps, electroactive diaphragm valves, solenoid valves, microcontrollers, logic gates, amplifiers, operational amplifiers, switches, global positioning system, wheatstone bridges, band-pass filters, low-pass filters, high-pass filters, RFID tags, spark generators, power inverters, analog to digital-converters, and thermal imaging devices.

17. The soft robot of claim 1, wherein the sensor comprises one or more of neural sensors, thermal sensors, strain sensors, chemical sensors, biological sensors, pressure sensors, barometric pressure sensors, vacuum sensors, altimeters, conductivity sensors, impedance sensors, inertial measurement units, force sensing resistors, laser range finders, acoustic range finders, magnetometers, hall effect sensors, magneto-diodes, magneto-transistors, MEMS magnetic field sensors, microphones, photo detectors, accelerometers, gyroscope sensors, flow sensors, humidity sensors, chemiresistors, volatile organic compound sensors, heavy metal sensors, pH sensors, sedimentation sensors, cardiac ablation sensors, myoelectric sensors , electronic noses, gas sensors, oxygen sensors, nitrogen sensors, natural gas sensors, VX sensors, sarin sensors, mustard gas sensors, tabun sensors, soman sensors, phosgene sensors, chlorine gas sensors, explosives detectors, acetone sensors, potassium nitrate sensors, potassium perchlorate sensors, ammonia sensors, narcotics sensors, metal detectors, radiological detectors, and current sensors.

18. The soft robot of claim 1, wherein the electrical component is adapted to function as a transistor, audio speakers, a soft strain sensor, a capacitive touch sensor, an LED, a neural sensor, a pressure sensor, a thermal sensor, a battery or an electroadhesion device.

19. A method of operating a soft robot comprising:
providing a soft robot according to claim 1; and
pressurizing or depressurizing the expandable or collapsible body to actuate the soft robot;
providing an input to the electrical component located on the strain limiting layer,
wherein the electrical component responds to the input to affect electrons or their associated fields, or whose behavior or physical state is altered by electrons or their associated field.

20. The method of claim 19, wherein the electrical component measures a voltage, current, or an impedance.

21. The method of claim 19, wherein the electrical component amplifies, attenuates, filters, or switches electronic signals.

22. The method of claim 19, wherein the electrical component does mechanical or electrical work in response to a change in supplied voltage and/or current.

23. The method of claim 19, wherein the electrical component emits radiation in response to a change in supplied voltage and/or current.

24. The method of claim 19, wherein the electrical component changes temperature in response to a change in supplied voltage and/or current.

25. The method of claim 19, wherein the electrical component functions as a transistor, an audio speaker, a soft strain sensor, a capacitive touch sensor, an LED, a neural sensor, a pressure sensor, a thermal sensor, a battery or an electroadhesion device.

26. The soft robot of claim 17, wherein the sensor is a piezo-resistive strain sensor.

27. The soft robot of claim 17, where the sensor is embedded in the strain limited layer.

28. The soft robot of claim 26, wherein the sensor is printed on a sheet paper.

29. The soft robot of claim 26, wherein the sensor is printed with a mixture of carbon black and an elastomer.

30. The soft robot of claim 28, wherein the paper is coated with an elastomer.

31. The soft robot of claim 26, wherein the piezo-resistive strain sensor is a curvature sensor.

32. The soft robot of claim 17, wherein the sensor comprises nanowires selected from the group consisting of gold nanowires, zinc oxide nanowires, and combinations thereof.

33. The soft robot of claim 18, wherein the sensor is part of a closed loop control system.

34. The soft robot of claim 17, wherein the sensor is configured to provide a resistance measurement correlated to one or more of the curvature, position, or location of the strain limited layer.

35. The soft robot of claim 17, wherein the sensor is configured to provide a capacitance measurement correlated to one or more of the curvature, position, or location of the strain limited layer.

36. The soft robot of claim 17, wherein the sensor is configured to provide pressure measurement correlated to a grip strength of the soft robot.

37. The soft robot of claim 17, wherein the sensor is selected from the group consisting of a thermocouple, a resistance temperature detector, a thermistor, a Zener diode configured to provide a voltage, a resistance measurement correlated to a temperature of the strain limited layer, and a combination thereof.

38. The soft robot of claim 17, wherein the sensor is selected from the group consisting of ferricyanide, heavy-metal ions, lactate, uric acid, potassium, sodium, glucose and a combination thereof.

39. The soft robot of claim 17, wherein the sensor is a cyclovoltameter.

40. The soft robot of claim 17, wherein the sensor is selected to be used in an immunoassay.

41. The soft robot of claim 17, wherein the sensor is the photo detector and the photo detector is configured to perform spectroscopy.

42. The soft robot of claim 41, wherein the spectroscopy is selected from the group consisting of infrared spectroscopy, visible spectroscopy, ultraviolet spectroscopy, and x-ray spectroscopy.

43. The method of claim 23, wherein the electrical component is an LED.

\* \* \* \* \*